US010700593B2

(12) United States Patent
Kubouchi

(10) Patent No.: US 10,700,593 B2
(45) Date of Patent: Jun. 30, 2020

(54) STEP-DOWN CHOPPER CIRCUIT HAVING BYPASS ELEMENTS

(71) Applicant: FUJI ELECTRIC CO., LTD., Kawasaki-shi, Kanagawa (JP)

(72) Inventor: Motoyoshi Kubouchi, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/146,293

(22) Filed: Sep. 28, 2018

(65) Prior Publication Data

US 2019/0149035 A1    May 16, 2019

(30) Foreign Application Priority Data

Nov. 14, 2017 (JP) ................... 2017-219176

(51) Int. Cl.
*H02M 1/32* (2007.01)
*H02M 3/07* (2006.01)
(Continued)

(52) U.S. Cl.
CPC .............. *H02M 1/32* (2013.01); *H02M 3/07* (2013.01); *H02M 3/158* (2013.01); *H02P 27/06* (2013.01);
(Continued)

(58) Field of Classification Search
CPC .......... H02M 1/32; H02M 3/07; H02M 3/158; H02M 2001/322; H02M 2001/325; H02M 2003/072; H02P 27/06
See application file for complete search history.

(56) References Cited

U.S. PATENT DOCUMENTS 8,664,926 B2    3/2014 Nakatomi et al.
9,525,348 B1 *  12/2016 Aeloiza ................. H02M 3/158
(Continued)

FOREIGN PATENT DOCUMENTS

| JP | 2009-189241 A | 8/2009 |
|----|---------------|--------|
| JP | 2010-239770 A | 10/2010 |
| JP | 2017-42028 A  | 2/2017 |

OTHER PUBLICATIONS

L. F. Costa, S. A. Mussa and I. Barbi, "Multilevel buck dc-dc converter for high voltage application," 2012 10th IEEE/IAS International Conference on Industry Applications, Fortaleza, 2012, pp. 1-8. (Year: 2012).*

*Primary Examiner* — Kyle J Moody
*Assistant Examiner* — Jye-June Lee

(57) ABSTRACT

A step-down chopper circuit having a filter reactor includes: a capacitor series circuit having a first capacitor and a second capacitor; a first series circuit having a semiconductor switching element and a diode, which is connected in parallel with the first capacitor, and a second series circuit having a diode and a semiconductor switching element, which is connected in parallel with the second capacitor; a chopper reactor whose one end is connected to a connection point of the first series circuit; and an output capacitor connected between the other end of the chopper reactor and a connection point of the second series circuit, in which a bypass current path with respect to the capacitor, which is configured to bypass a short-circuit current, is formed when one of the first series circuit and the second series circuit becomes a short-circuit state.

11 Claims, 19 Drawing Sheets

(51) Int. Cl.
  *H02P 27/06* (2006.01)
  *H02M 3/158* (2006.01)
  *H02M 7/537* (2006.01)
  *H02M 1/00* (2006.01)

(52) U.S. Cl.
  CPC ...... *H02M 7/537* (2013.01); *H02M 2001/007* (2013.01); *H02M 2001/322* (2013.01); *H02M 2001/325* (2013.01); *H02M 2003/072* (2013.01); *H02P 2201/11* (2013.01)

(56) References Cited

U.S. PATENT DOCUMENTS

2010/0244798 A1   9/2010   Nakatomi et al.
2017/0054288 A1   2/2017   Tsuyuki et al.
2017/0302068 A1*  10/2017  Kubouchi ............. H02M 3/158

* cited by examiner

STEP-DOWN CHOPPER CIRCUIT HAVING BYPASS ELEMENTS

CROSS REFERENCE TO RELATED APPLICATIONS AND INCORPORATION BY REFERENCE

This application claims benefit of priority under 35 USC 119 based on Japanese Patent Application No. 2017-219176 filed on Nov. 14, 2017, the entire contents of which are incorporated by reference herein.

TECHNICAL FIELD

The present invention relates to a step-down chopper circuit configured to step-down convert a DC input voltage into a DC voltage.

BACKGROUND ART

As a power conversion device including a step-down chopper circuit, a power conversion device described in, for example, JP 2009-189241 A is conventionally proposed.

In the power conversion device, a step-down chopper circuit is connected to an output side of a three-phase rectifier circuit, and a motor is connected to an output side of the step-down chopper circuit via an inverter. In the step-down chopper circuit, first and second capacitors are connected in series between a positive electrode-side electrode wire and a negative electrode-side electrode wire of the three-phase rectifier circuit, a first series circuit of a switching element and a diode is connected in parallel with the first capacitor, and a second series circuit of a diode and a switching element is connected in parallel with the second capacitor. One end of a reactor is connected to a connection point of the switching element and the diode of the first series circuit, and an output capacitor is connected between the other end of the reactor and a connection point of the diode and the switching element of the second series circuit.

In the step-down chopper circuit, when a short-circuit fault due to a surge voltage occurs in the first series circuit (or the second series circuit), the second capacitor (or the first capacitor) is excessively boosted, thereby possibly leading to a voltage breakdown.

In order to prevent the foregoing voltage breakdown of a capacitor of a boost chopper circuit, a DC-DC conversion device described in JP 2017-42028 A is proposed.

In the DC-DC conversion device, one ends of reactors are respectively connected to positive electrode-side and negative electrode-side of a DC power supply, and a first series circuit in which a diode and a semiconductor switching element are connected in series and a second series circuit in which a semiconductor switching element and a diode are connected in series are connected in series between a positive electrode-output electrode wire and a negative electrode-output electrode wire. The DC-DC conversion device has a configuration in which a first capacitor is connected in parallel with the first series circuit, a second capacitor is connected in parallel with the second series circuit, the other end of the positive electrode-side reactor is connected to a connection point of the semiconductor switching element and the diode of the first series circuit, and the other end of the negative electrode-side reactor is connected to a connection point of the diode and the semiconductor switching element of the second series circuit.

In the boost chopper circuit, when a short-circuit fault occurs in the first series circuit (or the second series circuit), by making the semiconductor switching element of the second series circuit (or the semiconductor switching element of the first series circuit) be in an on state, the second capacitor (or the first capacitor) is prevented from being excessively boosted and undergoing a voltage breakdown.

SUMMARY OF INVENTION

However, in the conventional technology described in the above JP 2017-42028 A, the configuration for preventing the voltage breakdown of the capacitor during the occurrence of the short-circuit fault in the boost chopper circuit is disclosed, but prevention of a voltage breakdown of a capacitor during the occurrence of a short-circuit fault in a step-down chopper circuit is not mentioned.

The present invention has been made in view of the problem of the invention according to the above-described JP 2009-189241 A, and an object of the present invention is to provide a step-down chopper circuit capable of preventing a voltage breakdown of a capacitor when a short-circuit fault occurs in a series circuit including a switching element, and a power conversion device using the same.

In order to achieve the object mentioned above, according to an aspect of the present invention, there is provided a step-down chopper circuit including: a positive electrode-side power wire connected to a positive electrode of a DC power supply, and a negative electrode-side power wire connected to a negative electrode of the DC power supply; a capacitor series circuit of a first capacitor and a second capacitor, which is connected between the positive electrode-side power wire and the negative electrode-side power wire; a first series circuit in which a first switching element and a first diode are connected in series, which is connected in parallel with the first capacitor, and a second series circuit in which a second diode and a second switching element are connected in series, which is connected in parallel with the second capacitor; a chopper reactor with one end is connected to a connection point of the first switching element and the first diode of the first series circuit; and an output capacitor connected between another end of the chopper reactor and a connection point of the second diode and the second switching element of the second series circuit. The step-down chopper circuit includes a first bypass current path to be formed with respect to the second capacitor when the first series circuit becomes a short-circuit state, and a second bypass current path to be formed with respect to the first capacitor when the second series circuit becomes a short-circuit state.

According to an aspect of the present invention, when a short-circuit fault occurs in one of a first series circuit and a second series circuit each including a switching element, a bypass current path of a short-circuit current is formed with respect to a capacitor to which the short-circuit current is supplied from the series circuit in which the short-circuit fault occurs, and thus, a step-down chopper circuit capable of preventing the capacitor from being boosted when the short-circuit fault occurs to prevent a voltage breakdown can be provided.

DESCRIPTION OF EMBODIMENTS

Next, with reference to the accompanying drawings, an embodiment according to the present invention will be described. In the following description of the drawings, the same or similar reference signs are assigned to the same or similar composing elements.

In addition, the embodiment, which will be described below, indicate devices and methods to embody the technical idea of the present invention, and the technical idea of the present invention does not limit the materials, shapes, structures, arrangements, and the like of the constituent components to those described below. The technical idea of the present invention can be subjected to a variety of alterations within the technical scope prescribed by the claims.

Hereinafter, a power conversion device according to a first embodiment of the present invention will be described with reference to the drawings.

Figure 1:
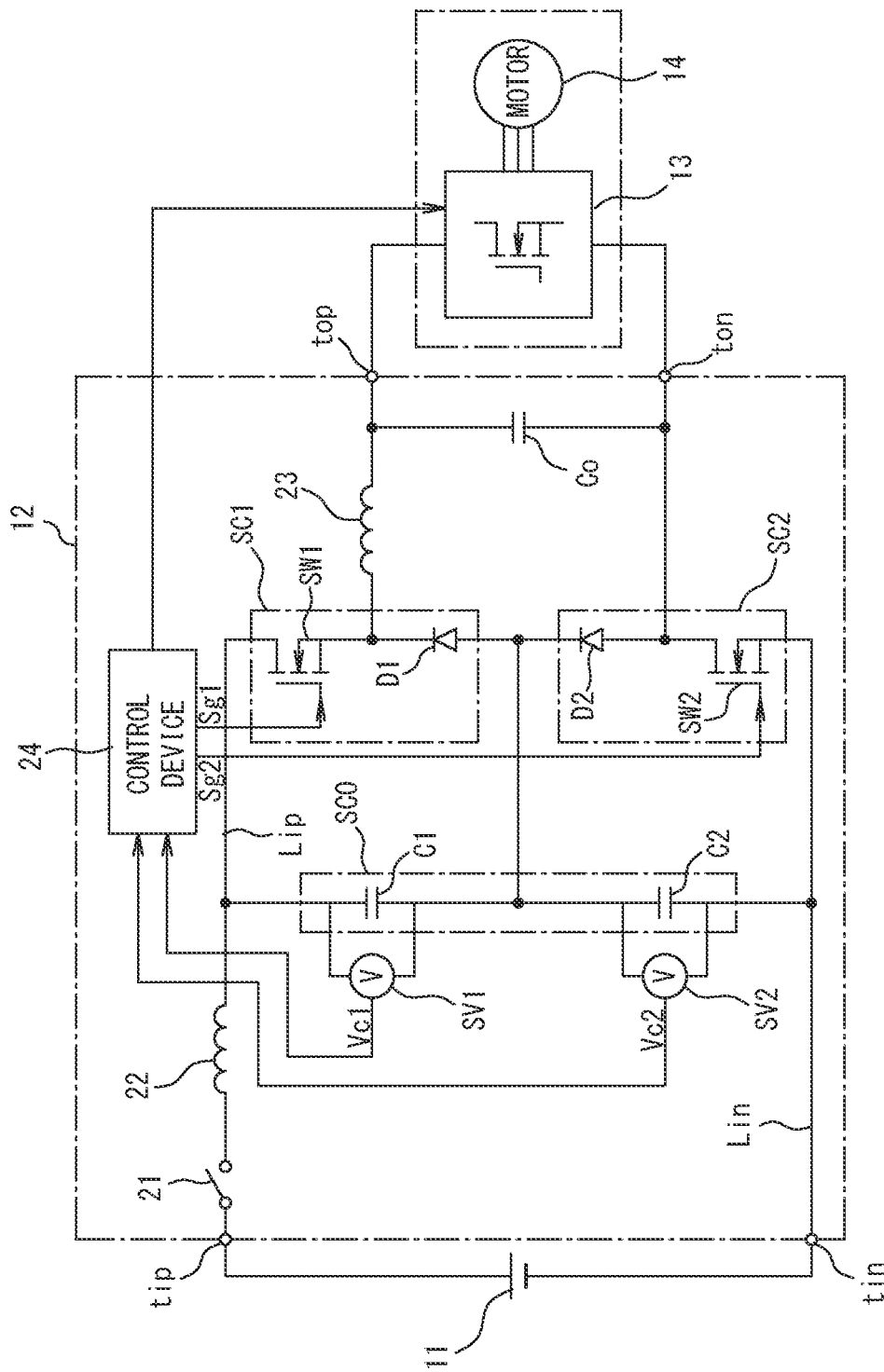
FIG. 1 is a circuit diagram illustrating a first embodiment of a power conversion device according to the present invention.

As illustrated in FIG. 1, the power conversion device includes a DC power supply 11, a step-down chopper circuit 12 configuring a DC-DC converter, an inverter 13, and a load 14 configured by, for example, a motor.

The step-down chopper circuit 12 includes an input-side positive electrode terminal tip and an input-side negative electrode terminal tin connected to the DC power supply 11, and an output-side positive electrode terminal top and an output-side negative electrode terminal ton connected to the inverter 13. An input-side positive electrode wire (positive electrode-side power wire) Lip and an input-side negative electrode wire (negative electrode-side power wire) Lin are connected to the input-side positive electrode terminal tip and the input-side negative electrode terminal tin. It is to be noted that, in the present embodiment, a current breaker 21 configured by a fuse and a current breaking device and a filter reactor 22 are inserted in the input-side positive electrode wire Lip. Here, the filter reactor 22 is provided so as to suppress a rapid change of the DC power supply 11.

In addition, in the step-down chopper circuit 12, a capacitor series circuit SC0 in which a first capacitor C1 and a second capacitor C2 are connected in series is connected between the subsequent stage side of the filter reactor 22 of the input-side positive electrode wire Lip and the input-side negative electrode wire Lin.

In addition, in the step-down chopper circuit 12, a first series circuit SC1 and a second series circuit SC2 are connected between the input-side positive electrode wire Lip and the input-side negative electrode wire Lin in parallel with the first capacitor C1 and the second capacitor C2. In the first series circuit SC1, a first semiconductor switching element SW1 connected to the input-side positive electrode wire Lip and a reverse connection first diode D1 are connected in series. In the second series circuit SC2, a second diode D2 connected in parallel with the second capacitor C2 and a second semiconductor switching element SW2 are connected in series. Here, the first semiconductor switching element SW1 and the second semiconductor switching element SW2 are configured by, for example, MOSFETs.

Specifically, a drain of the first semiconductor switching element SW1 is connected to the input-side positive electrode wire Lip, and a source is connected to a cathode of the first diode D1. In the second diode D2, a cathode is connected to an anode of the first diode D1, and an anode is connected to a drain of the second semiconductor switching element SW2. A source of the second semiconductor switching element SW2 is connected to the input-side negative electrode wire Lin.

The semiconductor switching elements SW1 and SW2 can apply other semiconductor switching elements, such as insulated gate bipolar transistors, bipolar transistors, and wide-bandgap semiconductor switching elements, without limiting to the MOSFETs. In addition, the first diode D1 and the second diode D2 are configured by semiconductor elements other than wide-bandgap semiconductor elements and are set to have withstand voltages lower than withstand voltages of the first capacitor C1 and the second capacitor C2.

Furthermore, the step-down chopper circuit 12 includes a chopper reactor 23 whose one end is connected to a connection point between the first semiconductor switching element SW1 and the first diode D1 of the first series circuit SC1, and an output capacitor Co connected between the other end of the chopper reactor 23 and a connection point of the second diode D2 and the second semiconductor switching element SW2 of the second series circuit SC2. Both ends of the output capacitor Co are connected to the output-side positive electrode terminal top and the output-side negative electrode terminal ton.

A first gate signal Sg1 and a second gate signal Sg2 are separately supplied from a control device 24 to gate terminals that are control terminals of the semiconductor switching element SW1 of the first series circuit SC1 and the semiconductor switching element SW2 of the second series circuit SC2.

A first voltage sensor SV1 and a second voltage sensor SV2 configured to detect inter-terminal voltages Vc1 and Vc2 are respectively provided in the first capacitor C1 and the second capacitor C2, and the inter-terminal voltages Vc1 and Vc2 detected by the first voltage sensor SV1 and the second voltage sensor SV2 are supplied to the control device 24.

In the control device 24, whether or not a short-circuit fault occurs in one of the first series circuit SC1 and the second series circuit SC2 is determined on the basis of the inter-terminal voltage Vc1 of the first capacitor C1 and the inter-terminal voltage Vc2 of the second capacitor C2. More specifically, when the inter-terminal voltage Vc1 of the first capacitor C1 is less than a preset voltage value (set voltage value), it is determined that the second series circuit SC2 is normal. In addition, when the inter-terminal voltage Vc1 becomes the set voltage value or more, it is determined that the short-circuit fault occurs in the second series circuit SC2. Furthermore, when the inter-terminal voltage Vc2 of the second capacitor C2 is less than a preset voltage value (set voltage value), it is determined that the first series circuit SC1 is normal. In addition, when the inter-terminal voltage Vc2 becomes the set voltage value or more, it is determined that the short-circuit fault occurs in the first series circuit SC1.

In addition, when it is determined that the short-circuit fault occurs in the first series circuit SC1 (or the second series circuit SC2), the control device 24 controls each semiconductor switching element of the inverter 13 to be in an off state. At the same time, the control device 24 controls the second semiconductor switching element SW2 (or the first semiconductor switching element SW1) to be in an on state such that a supply of a charge current to the second capacitor C2 (or the first capacitor C1) is prevented.

Next, an operation of the above-described first embodiment will be described.

A DC voltage outputted from the DC power supply 11 is stepped down to a predetermined voltage by the step-down chopper circuit 12 to be supplied to the inverter 13, and the DC voltage is converted into, for example, a three-phase AC voltage by the inverter 13 to be supplied to a three-phase motor 14 as the load, so that the three-phase motor 14 is driven.

At this time, in the step-down chopper circuit 12, first, the first semiconductor switching element SW1 is controlled to be in the on state and the second semiconductor switching element SW2 is controlled to be in the on state by the control device 24. Accordingly, a current path from the first capacitor C1 back to the first capacitor C1 via the first semiconductor switching element SW1, the chopper reactor 23, the output capacitor Co, the second semiconductor switching element SW2, and the second capacitor C2 is formed.

In addition, when the first semiconductor switching element SW1 is controlled to be in the on state and the second semiconductor switching element SW2 is controlled to be in the off state by the control device 24, a current path from the first capacitor C1 back to the first capacitor C1 via the first semiconductor switching element SW1, the chopper reactor 23, the output capacitor Co, and the second diode D2 is formed.

Furthermore, when the first semiconductor switching element SW1 is controlled to be in the off state and the second semiconductor switching element SW2 is controlled to be in the on state by the control device 24, a current path from the second capacitor C2 back to the second capacitor C2 via the first diode D1, the chopper reactor 23, the output capacitor Co, and the second semiconductor switching element SW2 is formed.

In addition, when the first semiconductor switching element SW1 is controlled to be in the off state and the second semiconductor switching element SW2 is controlled to be in the off state by the control device 24, a current path from the first diode D1 back to the first diode D1 via the chopper reactor 23, the output capacitor Co, and the second diode D2 is formed.

Accordingly, the on-off operation of the first semiconductor switching element SW1 and the second semiconductor switching element SW2 is repeated such that a voltage value of a positive electrode of the output capacitor Co is smaller than the total value of the voltage value of the first capacitor C1 and the voltage value of the second capacitor C2, and the size of an on-off time ratio, i.e. a duty ratio is controlled.

In the foregoing step-down chopper circuit 12, when a fault occurs, protection is generally tried such that a current does not flow into the three-phase motor 14 as the load by turning off the semiconductor switching elements SW1 and SW2 of the step-down chopper circuit 12 or by turning off the semiconductor switching element of the inverter 13 configured to drive the subsequent load 14.

However, in the step-down chopper circuit 12, when the short-circuit fault occurs due to a voltage surge in the first semiconductor switching element SW1 and the first diode D1 of one series circuit, for example, the first series circuit SC1, as a normal measure, an operation for separating the three-phase motor 14 as the load from the step-down chopper circuit 12 by turning off the semiconductor switching element of the inverter 13 and making the second semiconductor switching element SW2 of the other series circuit of the step-down chopper circuit 12, the second series circuit SC2, be in the off state is performed.

At this time, the filter reactor 22, the first semiconductor switching element SW1 and the first diode D1 in which the short-circuit fault occurs, and the opposite second capacitor C2 form a series resonance circuit for the DC power supply 11. Thus, the inter-terminal voltage Vc2 of the second capacitor C2 becomes much higher than a voltage during a normal operation. The voltage of the second capacitor C2 operates at a half voltage of the DC power supply 11 in normal times, and thus, by the series resonance circuit, the voltage of the second capacitor C2 reaches about more than triple compared to in normal times. When the withstand voltage of the second capacitor C2 is low, a voltage breakdown occurs, energy thereof is released, and an explosion and a burnout possibly occur.

In addition, the current breaker 21, such as a current breaking device and a fuse, is provided in series with the DC power supply 11 and the filter reactor 22 as in FIG. 1, and interruption of a series resonance current is tried by the current breaker 21.

However, a large current is necessary and long time is required for fusing of the fuse, and thus, the voltage of the second capacitor C2 increases first. On the other hand, in the interruption with the current breaking device, quick interruption cannot be performed because an inductance of the filter reactor 22 is large. More specifically, when the quick interruption is performed, the semiconductor switching element or the like generates an off-surge to be broken down, thereby resulting in the short-circuit fault, the series resonance current cannot be interrupted, and thus, the interruption also needs to be performed slowly. In addition, it is difficult to prevent the voltage breakdown of the second capacitor C2 by interrupting the series resonance current with a mechanical contact breaking device. Therefore, the voltage breakdown of the second capacitor C2 cannot be prevented by the interruption of the series resonance current.

Thus, in the first embodiment, when the short-circuit fault occurs in the first series circuit SC1, so that the inter-terminal voltage Vc2 of the second capacitor C2 increases to the preset set value, the occurrence of the short-circuit fault of the first series circuit SC1 is detected by the control device 24. When detecting the occurrence of the short-circuit fault, the control device 24 controls the semiconductor switching element included in the inverter 13 to be in the off state to separate the three-phase motor 14 as the load from the step-down chopper circuit 12.

Figure 2:
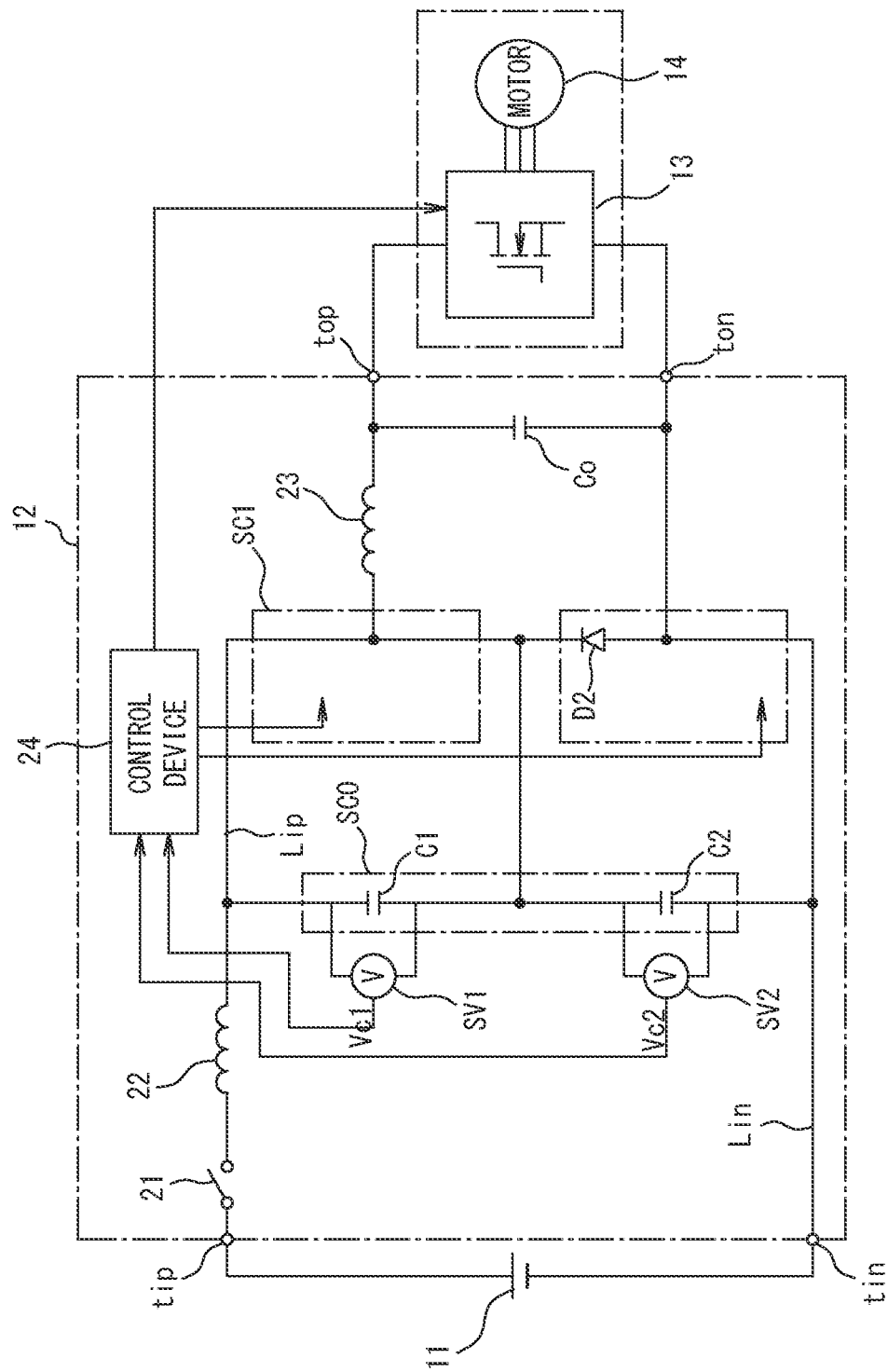
FIG. 2 is a circuit diagram illustrating an energizing path during the occurrence of a short-circuit fault in the first embodiment.

At the same time, the semiconductor switching element SW1 of the first series circuit SC1 is made to be in the off state, and the semiconductor switching element SW2 of the second series circuit SC2 is made to be in the on state. Thus, as illustrated in FIG. 2, since the short-circuit fault occurs in the first series circuit SC1, the step-down chopper circuit 12 is not closed and maintains the short-circuit state even when the semiconductor switching element SW1 is controlled to be in the off state. The series resonance current to be supplied to the second capacitor C2 at this time cannot be controlled because the short-circuit fault occurs in the first series circuit SC1.

In the second series circuit SC2, although the semiconductor switching element SW2 is controlled to be in the on state, the diode D2 is connected in the opposite direction, and thus, the second capacitor C2 is boosted until a cathode voltage of the diode D2 reaches the withstand voltage. In other words, the voltage of the second capacitor C2 is maintained only by the second diode D2.

Then, when the cathode voltage of the diode D2 reaches a voltage lower than the withstand voltage of the second capacitor C2, the diode D2 breaks down, and a current path through the diode D2 and the second semiconductor switching element SW2 is formed (not illustrated). Thus, since a first bypass current path is formed in parallel with the second capacitor C2, the boost of the second capacitor C2 is stopped and discharge of the second capacitor C2 is started.

When the second diode D2 breaks down and the first bypass current path is formed, the DC power supply 11 becomes a short-circuit state by the first series circuit SC1 in which the short-circuit fault occurs and the breakdown of the second diode D2. Thus, since a large short-circuit current flows from the DC power supply 11, the current pathway is interrupted by the current breaker 21 (fuse or the like), and the step-down chopper circuit 12 is stopped.

Conversely, when the short-circuit fault occurs in the second series circuit SC2, by controlling the semiconductor switching element SW1 of the first series circuit SC1 to be in the on state, a boost of the first capacitor C1 is maintained by the first diode D1. Then, when a cathode voltage of the first diode D1 reaches a voltage lower than the withstand voltage of the first capacitor C1, the first diode D1 breaks down, the first series circuit SC1 becomes a short-circuit state, and a second bypass current path is formed in parallel with the first capacitor C1. Thus, the boost of the first capacitor C1 is stopped and discharge is started.

When the first diode D1 breaks down and the second bypass current path is formed, the DC power supply 11 becomes a short-circuit state by the second series circuit SC2 in which the short-circuit fault occurs and the breakdown of the first diode D1. Thus, since the current pathway is interrupted by the current breaker 21 (fuse or the like), the step-down chopper circuit 12 is stopped.

As just described, in the first embodiment, the withstand voltage of the first diode D1 is set to be lower with respect to the withstand voltage of the first capacitor C1. In addition, the withstand voltage of the second diode D2 is set to be lower with respect to the withstand voltage of the second capacitor C2. At the same time, when the short-circuit fault occurs in the first series circuit SC1 (or the second series circuit SC2), the second semiconductor switching element SW2 of the second series circuit SC2 (or the first semiconductor switching element SW1 of the first series circuit SC1) is made to be in the on state.

Accordingly, since the second diode D2 (or the first diode D1) breaks down, the voltage breakdown of the first capacitor C1 (or the second capacitor C2) can be prevented.

At this time, the first diode D1 and the second diode D2 to be broken down are configured by easily processable semiconductor other than wide-bandgap semiconductor, so that the withstand voltages lower than the withstand voltages of the capacitors C1 and C2 can be easily set.

Figure 3:
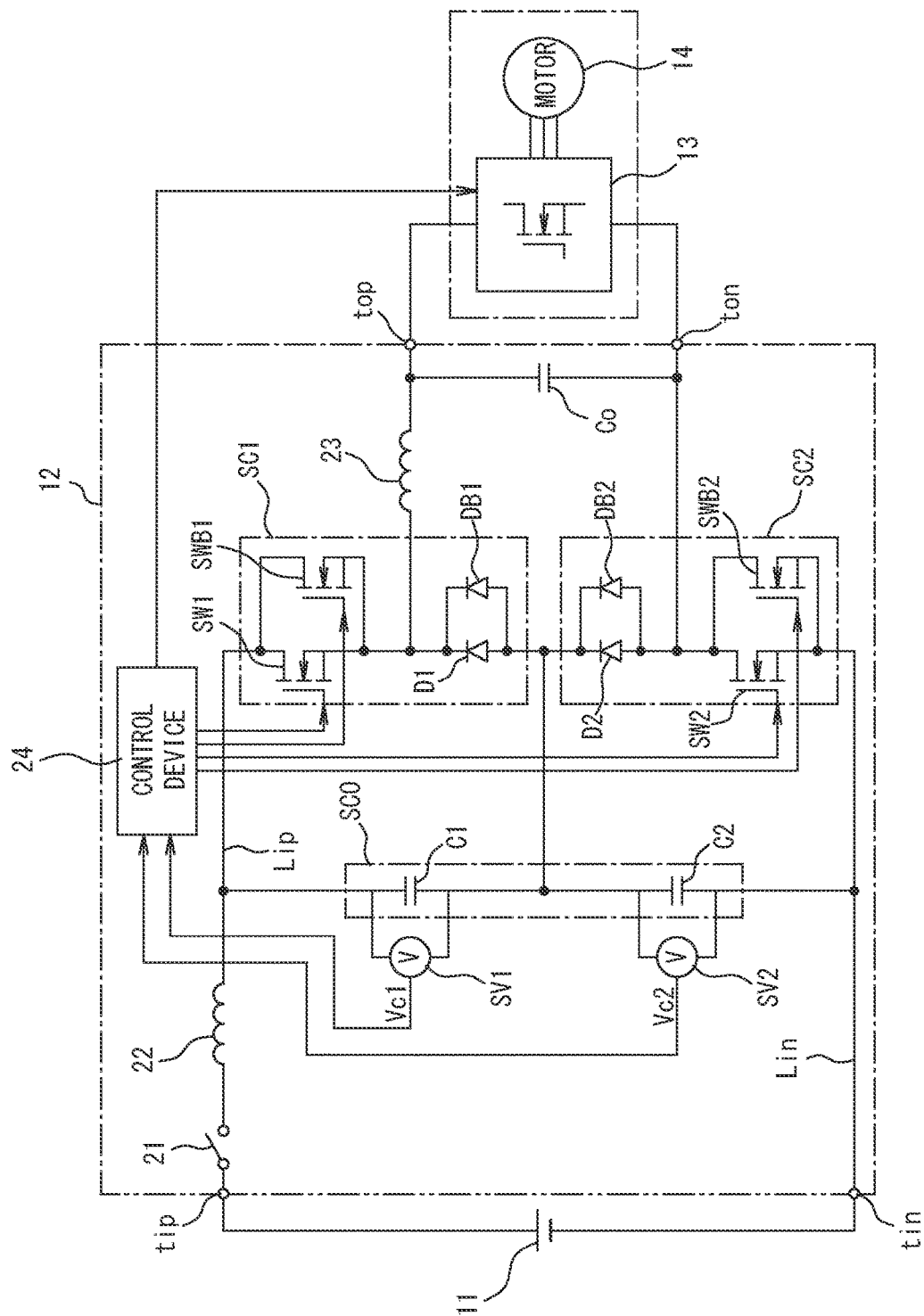
FIG. 3 is a circuit diagram illustrating a second embodiment of the power conversion device according to the present invention.

Next, a second embodiment of the present invention will be described with reference to FIG. 3 and FIG. 4.

In the second embodiment, the formation of the bypass current paths with respect to the capacitors is changed.

In the second embodiment, in the first series circuit SC1, the first semiconductor switching element SW1 configured by a wide-bandgap semiconductor element and the backflow prevention first diode D1 configured by a wide-bandgap semiconductor element in the same manner configure a series circuit.

In addition, the first series circuit SC1 includes a bypass semiconductor switching element SWB1 connected in parallel with the first semiconductor switching element SW1 and a bypass diode DB1 connected in parallel with the first diode D1.

The bypass semiconductor switching element SWB1 and the bypass diode DB1 are configured by semiconductor elements other than wide-bandgap semiconductor elements. In addition, the bypass diode DB1 is set to have a withstand voltage lower than the withstand voltage of the first diode D1 and the withstand voltage of the first capacitor C1.

In addition, in the second series circuit SC2, the second semiconductor switching element SW2 configured by a wide-bandgap semiconductor element and the backflow prevention second diode D2 configured by a wide-bandgap semiconductor element in the same manner configure a series circuit.

In addition, the second series circuit SC2 includes a bypass semiconductor switching element SWB2 connected in parallel with the second semiconductor switching element SW2 and a bypass diode DB2 connected in parallel with the second diode D2.

The bypass semiconductor switching element SWB2 and the bypass diode DB2 are configured by semiconductor elements other than wide-bandgap semiconductor elements. In addition, the bypass diode DB2 is set to have a withstand voltage lower than the withstand voltage of the second diode D2 and the withstand voltage of the second capacitor C2.

Here, the first diode D1 and the second diode D2, and the bypass diodes DB1 and DB2 are housed in different packages. The first diode D1 and the second diode D2 are also housed in different packages.

The first semiconductor switching element SW1 and the second semiconductor switching element SW2 are on-off controlled by the control device 24 during the normal operation in which the short-circuit fault of the step-down chopper circuit 12 does not occur. In contrast, the bypass semiconductor switching elements SWB1 and SWB2 are controlled to be in the on state by the control device 24 when one of the first series circuit SC1 and the second series circuit SC2 is in the short-circuit fault state. In this case, the bypass semiconductor switching elements SWB1 and SWB2 may be controlled to be in the on state at the same time during the occurrence of the short-circuit fault, or only the bypass semiconductor switching element SWB2 (or SWB1) may be made to be in the on state when the short-circuit fault occurs in the first series circuit SC1 (or the second series circuit SC2).

Other configurations are the same as the configurations of the above-described first embodiment, the corresponding parts to the first embodiment are denoted by the same reference numerals, and the detailed description thereof will be omitted.

According to the second embodiment, in a normal state where the short-circuit fault does not occur in the first series circuit SC1 and the second series circuit SC2, the first semiconductor switching element SW1 and the second semiconductor switching element SW2 are on-off controlled by the control device 24. Accordingly, a DC voltage stepped down to be lower than the total value of the voltage value of the first capacitor C1 and the voltage value of the second capacitor C2 is outputted from the output capacitor Co to the inverter 13.

In addition, when the short-circuit fault occurs in the first series circuit SC1 (or the second series circuit SC2), an increase in the inter-terminal voltage Vc2 of the second capacitor C2 (or the inter-terminal voltage Vc1 of the first capacitor C1) can be detected by the voltage sensor SV2 (or SV1). The detection voltage of the voltage sensor SV2 (or SV1) is supplied to the control device 24.

Thus, when the inter-terminal voltage Vc2 (or Vc1) becomes the preset set voltage or more, the control device 24 makes each semiconductor switching element of the inverter 13 be in the off state to separate the inverter 13 and the three-phase motor 14 from the step-down chopper circuit 12. At the same time, the control device 24 controls the first semiconductor switching element SW1 and the second semiconductor switching element SW2 to be in the off state and controls the bypass semiconductor switching elements SWB1 and SWB2 (only SWB2 or only SWB1) to be in the on state.

Figure 4:
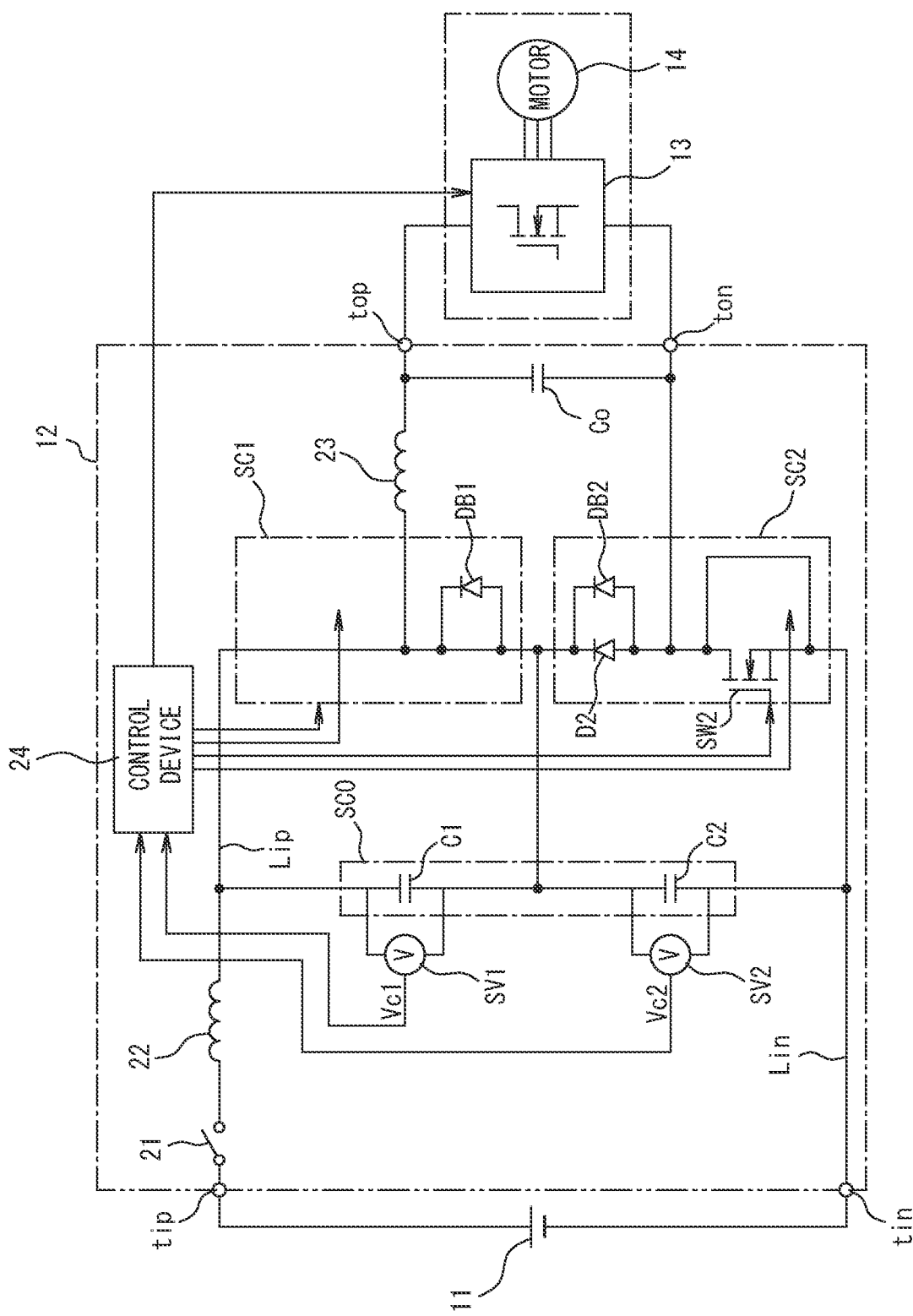
FIG. 4 is a circuit diagram illustrating an energizing path during the occurrence of the short-circuit fault in the second embodiment.

Therefore, as illustrated in FIG. 4, in the first series circuit SC1 in which the short-circuit fault occurs, the first semiconductor switching element SW1, the first diode D1, and the bypass semiconductor switching element SWB1 become a conduction state, and thus, only the bypass diode DB1 maintains a state connected in the opposite direction. In contrast, in the second series circuit SC2, the second diode D2 and the bypass diode DB2 maintain a state connected in the opposite direction, the second semiconductor switching element SW2 is also in the off state, and only the bypass semiconductor switching element SWB2 become a conduction state.

Therefore, a current flows via the first series circuit SC1, and the inter-terminal voltage Vc2 of the second capacitor C2 increases. However, when reaching the withstand voltage of the bypass diode DB2 set to have a withstand voltage lower than the withstand voltage of the second capacitor C2, the bypass diode DB2 breaks down and becomes a conduction state.

Thus, since the second series circuit SC2 becomes a conduction state, a first bypass current path in parallel with the second capacitor C2 is formed. Therefore, the boost of the second capacitor C2 is stopped and discharge of the second capacitor C2 is started.

When the bypass diode DB2 breaks down and the first bypass current path is formed, the DC power supply 11 becomes a short-circuit state by the first series circuit SC1 in which the short-circuit fault occurs and the breakdown of the bypass diode DB2. Thus, since the current pathway is interrupted by the current breaker 21 (fuse or the like), the step-down chopper circuit 12 is stopped.

Similarly, when the short-circuit fault occurs in the second series circuit SC2, by controlling the bypass semiconductor switching element SWB1 of the first series circuit SC1 to be in the on state, a boost of the first capacitor C1 is maintained by the bypass diode DB1. Then, when a cathode voltage of the bypass diode DB1 reaches a withstand voltage lower than the withstand voltage of the first capacitor C1, the bypass diode DB1 breaks down, the first series circuit SC1 becomes a short-circuit state, and a second bypass current path is formed in parallel with the first capacitor C1. Thus, the boost of the first capacitor C1 is stopped and discharge is started.

When the bypass diode DB1 breaks down and the second bypass current path is formed, the DC power supply 11 becomes a short-circuit state by the second series circuit SC2 in which the short-circuit fault occurs and the breakdown of the bypass diode DB1. Thus, since the current pathway is interrupted by the current breaker 21 (fuse or the like), the step-down chopper circuit 12 is stopped.

As just described, in the second embodiment, the withstand voltages of the bypass diodes DB1 and DB2 are set to be lower with respect to the withstand voltages of the first capacitor C1 and the second capacitor C2. At the same time, when the short-circuit fault occurs in the first series circuit SC1 (or the second series circuit SC2), the bypass switching element SWB2 of the second series circuit SC2 (or the bypass semiconductor switching element SWB1 of the first series circuit SC1) is made to be in the on state.

Accordingly, since the bypass diode D2 (or the bypass diode D1) breaks down, the voltage breakdown of the first capacitor C1 (or the second capacitor C2) can be prevented.

At this time, the bypass diodes DB1 and DB2 to be broken down are configured by easily processable semiconductor other than wide-bandgap semiconductor, so that the withstand voltages lower than the withstand voltages of the capacitors C1 and C2 can be easily set.

In addition, the bypass diodes DB1 and DB2 that are broken down and short-circuited sometimes undergo a voltage breakdown. The first diode D1 and the second diode D2 configured by expensive wide-bandgap semiconductor elements are prevented from breaking down, so that the fault of the first diode D1 and the second diode D2 can be prevented.

In addition, since the bypass diodes DB1 and DB2 to be broken down are housed in packages different from those of the first diode D1 and the second diode D2 configured by wide-bandgap semiconductor elements, there is an advantage that the first diode D1 or the second diode D2 needs not to be replaced when replacing the bypass diode DB1 or DB2.

Furthermore, the bypass semiconductor switching element SB2 (or SB1) that is made to be in the on state during the short-circuit fault of the first series circuit SC1 (or the second series circuit SC2) is sometimes broken down due to the exceeding of a short-circuit tolerance. Thus, the second semiconductor switching element SW2 (or the first semiconductor switching element SW1) configured by an expensive wide-bandgap semiconductor element is prevented from conducting, so that the breakdown of the second semiconductor switching element SW2 (or the first semiconductor switching element SW1) can be prevented.

In addition, since the bypass semiconductor switching elements SWB1 and SWB2, and the first semiconductor switching element SW1 and the second semiconductor switching element SW2 are housed in different packages, there is an advantage that the first semiconductor switching element SW1 and the second semiconductor switching element SW2 need not to be replaced at the same time during the fault of the bypass semiconductor switching elements SWB1 and SWB2.

Next, a third embodiment of the present invention will be described with reference to FIG. 5.

The third embodiment is configured to be operable as a bidirectional converter in the above-described second embodiment.

Figure 5:
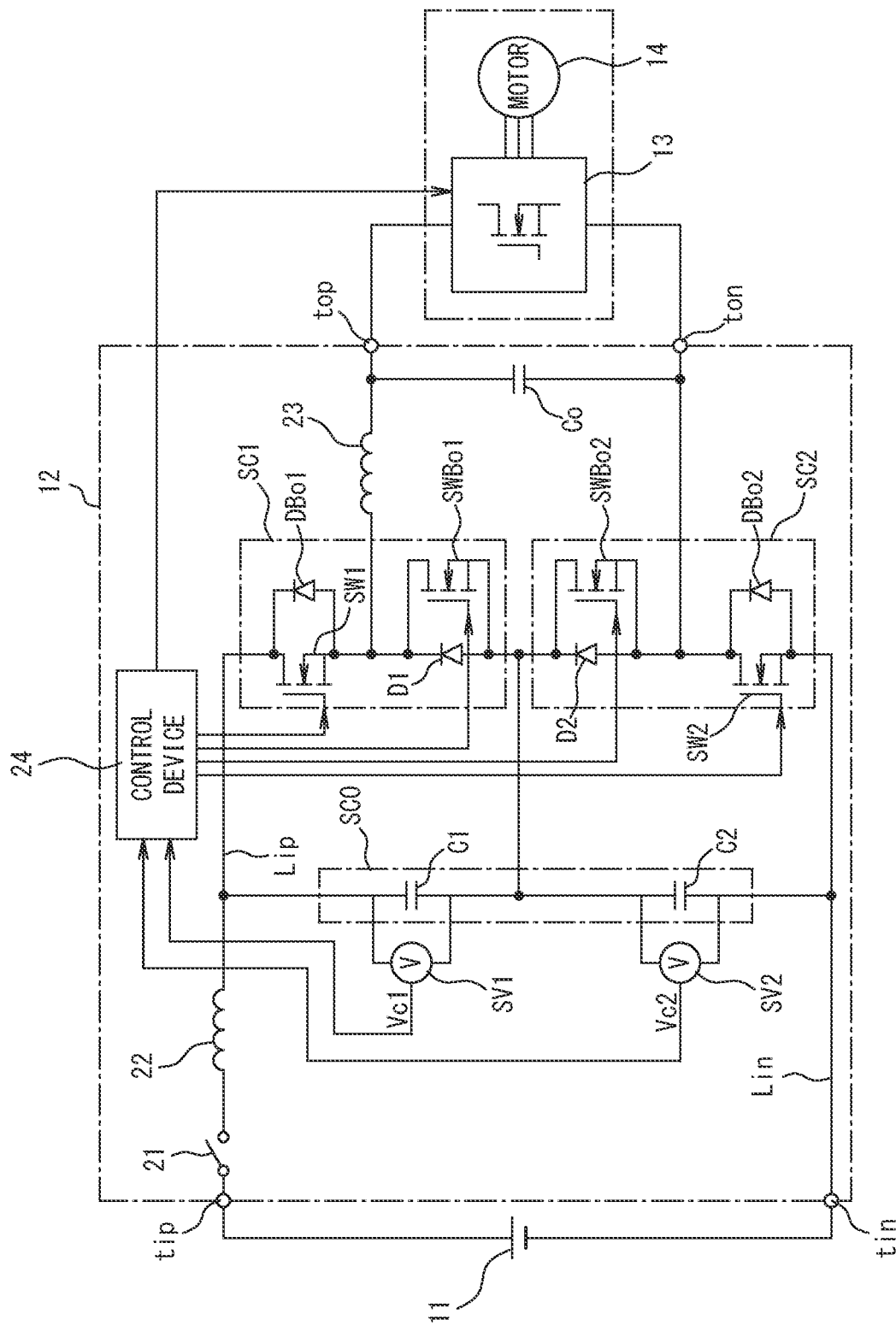
FIG. 5 is a circuit diagram illustrating a third embodiment of the power conversion device according to the present invention.

More specifically, in the third embodiment, as illustrated in FIG. 5, in the first series circuit SC1, a boost diode DBo1 is inverse-parallel connected in parallel with the first semiconductor switching element SW1. In addition, a boost semiconductor switching element SWBo1 is connected in parallel with the first diode D1.

In addition, in the second series circuit SC2, a boost semiconductor switching element SWBo2 is connected in parallel with the second diode D2. In addition, a boost diode DBo2 is inverse-parallel connected in parallel with the second semiconductor switching element SW2.

Here, the boost semiconductor switching elements SWBo1 and SWBo2 are set to have withstand voltages lower than the withstand voltages of the first capacitor C1 and the second capacitor C2. The chemical compositions of the boost diodes DBo1 and DBo2 may be wide-bandgap semiconductor or anything else, and the package may be the same as or different from that of the first semiconductor switching element SW1 and the second semiconductor switching element SW2.

According to the third embodiment, the first semiconductor switching element SW1 and the second semiconductor switching element SW2 are on-off controlled by the control device 24, so that an operation as a step-down chopper configured to output a DC voltage lower than the DC voltage of the DC power supply 11 is possible similarly to the above-described first embodiment and second embodiment.

In the case of the operation as the step-down chopper, when the short-circuit fault occurs in the first series circuit SC1 (or the second series circuit SC2), the second semiconductor switching element SW2 (or the first semiconductor switching element SW1) is made to be in the on state, the boost semiconductor switching element SWBo2 (or SWBo1) is broken down, and a first bypass current path (or a second bypass current path) with respect to the second capacitor C2 (or the first capacitor C1) can be formed.

On the other hand, when a regenerative voltage from the three-phase motor 14 is inputted to the output-side positive electrode terminal top and the output-side negative electrode terminal ton via the inverter 13, the first semiconductor switching element SW1 and the second semiconductor switching element SW2 are controlled to be in the off state, and the boost semiconductor switching elements SWBo1 and SWBo2 are on-off controlled by the control device 24, so that an operation as a boost chopper configured to boost the regenerative voltage and charge the DC power supply 11 is possible.

In the case of the operation as the boost chopper, when the short-circuit fault occurs in the second series circuit SC2, a current from the output capacitor Co flows into the output capacitor Co via the chopper reactor 23, the boost diode DBo1, the first capacitor C1, and the second diode D2 of the second series circuit SC2 in the short-circuit state. Accordingly, the inter-terminal voltage Vc1 of the first capacitor C1 is boosted.

At this time, the inter-terminal voltage Vc1 of the first capacitor C1 is detected by the voltage sensor SV1, and the detected inter-terminal voltage Vc1 is supplied to the control device 24. When the inter-terminal voltage Vc1 exceeds the preset set voltage, the control device 24 detects that the short-circuit fault occurs in the second series circuit SC2 and controls the boost semiconductor switching element SWBo1 of the first series circuit SC1 to be in the on state.

Thus, the second bypass current path in parallel with the first capacitor C1, in which the current from the output capacitor Co is back to the output capacitor Co via the chopper reactor 23, the boost semiconductor switching element SWBo1, and the short-circuited second diode D2 of the second series circuit SC2, is formed.

Therefore, the boost of the first capacitor C1 is stopped, discharge is started, and the voltage breakdown of the first capacitor C1 is prevented.

In addition, when the short-circuit fault occurs in the first series circuit SC1, a current path in which the current from the output capacitor Co is back to the output capacitor Co via the chopper reactor 23, the first diode D1 in the short-circuit state of the first series circuit SC1, the second capacitor C2, and the boost diode DBo2 is formed. Accordingly, the inter-terminal voltage Vc2 of the second capacitor C2 is boosted.

At this time, the inter-terminal voltage Vc2 of the second capacitor C2 is detected by the voltage sensor SV2, and the detected inter-terminal voltage Vc2 is supplied to the control device 24. When the inter-terminal voltage Vc2 exceeds the preset set voltage, the control device 24 detects that the short-circuit fault occurs in the first series circuit SC1 and controls the boost semiconductor switching element SWBo2 of the second series circuit SC2 to be in the on state.

Thus, the first bypass current path in parallel with the second capacitor C2, in which the current from the output capacitor Co is back to the output capacitor Co via the chopper reactor 23, the boost semiconductor switching element SWBo1, and the short-circuited second diode D2 of the second series circuit SC2, is formed.

Therefore, the boost of the second capacitor C2 is stopped, discharge is started, and the voltage breakdown of the second capacitor C2 is prevented.

In addition, in the case of the operation as the step-down chopper, regarding the formation of the bypass current paths, the boost semiconductor switching element SWBo1 or SWBo2 may be broken down instead of controlling the boost semiconductor switching element SWBo1 or SWBo2 to be in the on state.

According to the third embodiment, the bypass current path of the first capacitor C1 or the second capacitor C2 is formed using the boost semiconductor switching element SWBo1 or SWBo2 of the bidirectional converter capable of interchanging the input side and the output side, and thus, the same operation and effect as the above-described first embodiment or second embodiment can be obtained.

Next, a fourth embodiment of the present invention will be described with reference to FIG. 6.

The fourth embodiment is configured such that the bypass current paths are formed in the first diode and the second diode in the above-described first embodiment.

Figure 6:
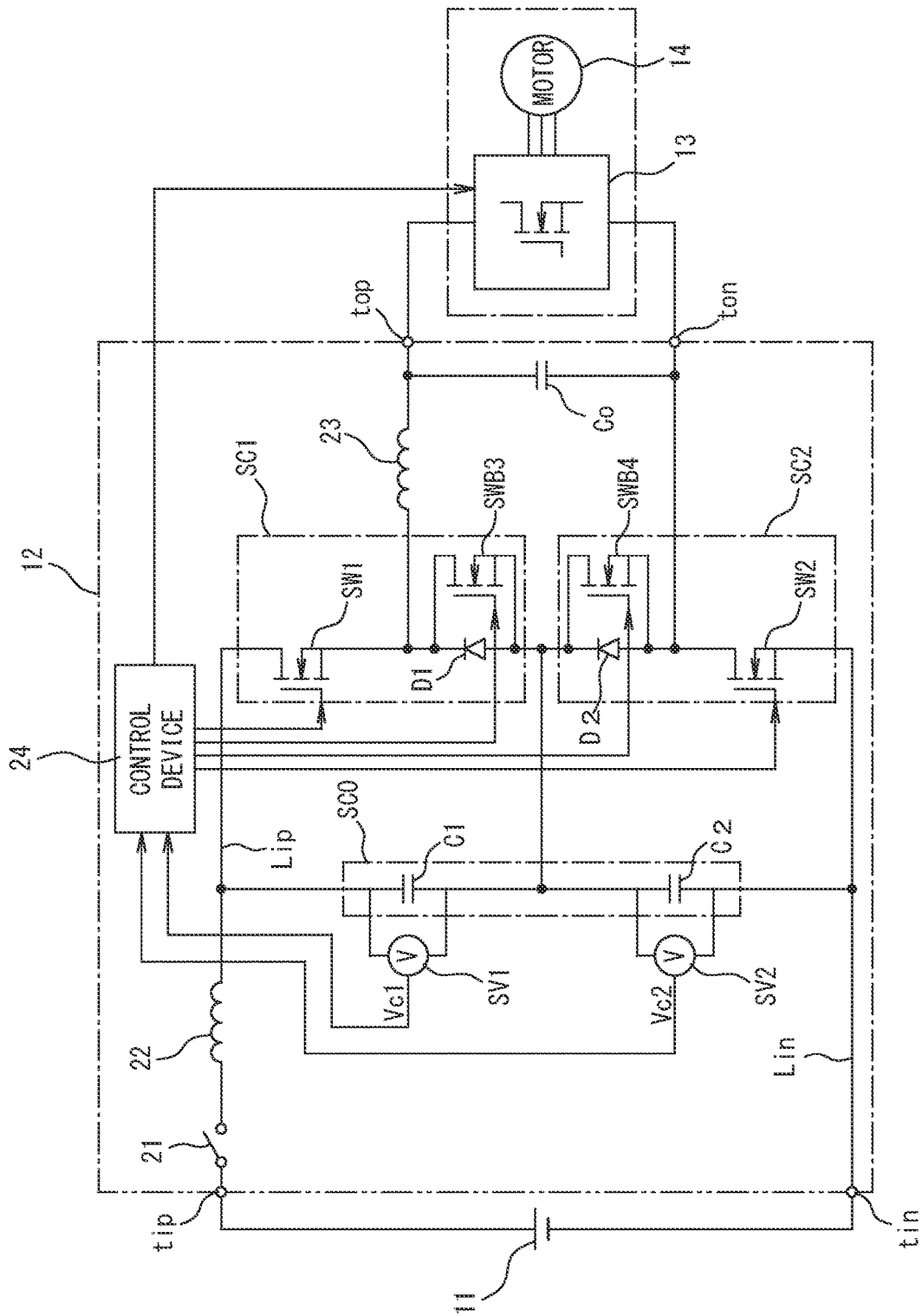
FIG. 6 is a circuit diagram illustrating fourth and fifth embodiments of the power conversion device according to the present invention.

More specifically, as illustrated in FIG. 6, the fourth embodiment has a configuration in which a bypass semiconductor switching element SWB3 is connected in parallel with the first diode D1 and a bypass semiconductor switching element SWB4 is also connected in parallel with the second diode D2 in the above-described first embodiment.

Here, gate terminals of the bypass semiconductor switching elements SWB3 and SWB4 are connected to the control device 24, and when the short-circuit fault of the first series circuit SC1 (or the second series circuit SC2) is detected, the bypass semiconductor switching element SWB4 (or SWB3) is controlled to be in the on state.

Other configurations are the same as the configurations of the first embodiment, the corresponding parts to FIG. 1 are denoted by the same reference numerals, and the detailed description thereof will be omitted.

According to the fourth embodiment, in the case of performing a step-down chopper operation, the bypass semiconductor switching elements SWB3 and SWB4 are controlled to be in the off state by the control device 24, so that the same operation as the first embodiment is performed.

In addition, the short-circuit fault occurs in the first series circuit SC1 (or the second series circuit SC2) during the step-down chopper operation, the second capacitor C2 (or the first capacitor C1) is boosted.

When the short-circuit fault of the first series circuit SC1 (or the second series circuit SC2) is detected by the control device 24, the second semiconductor switching element SW2 (or the first semiconductor switching element SW1) is made to be in the on state in the same manner as the first embodiment. At the same time, the control device 24 controls the bypass semiconductor switching element SWB4 of the second series circuit SC2 (or the bypass semiconductor switching element SWB3 of the first series circuit SC1) to be in the on state.

Therefore, the second series circuit SC2 (or the first series circuit SC1) becomes a short-circuit state, a first bypass current path (or a second bypass current path) with respect to the second capacitor C2 (or the first capacitor C1) is formed, the boost of the second capacitor C2 (or the first capacitor C1) is stopped, and discharge is started. Thus, the voltage breakdown of the second capacitor C2 (or the first capacitor C1) can be prevented.

In this case, the second semiconductor switching element SW2 and the bypass semiconductor switching element SWB4 (or the first semiconductor switching element SW1 and the bypass semiconductor switching element SWB3) in the on state discharge a charge of the second capacitor C2 (or the first capacitor C1), and thus, a short-circuit breakdown sometimes occurs due to the exceeding of the short-circuit tolerance, or a current from the DC power supply 11 increases due to the short circuit, thereby sometimes leading to a short-circuit breakdown due to the exceeding of the short-circuit tolerance.

However, since the energy of the second semiconductor switching element SW2 and the bypass semiconductor switching element SWB4 (or the first semiconductor switching element SW1 and the bypass semiconductor switching element SWB3) during the breakdown is much smaller than the energy of the capacitor during the breakdown, this can be allowed. Then, the current from the DC power supply 11 is interrupted by the current breaker 21 including a fuse, and the step-down chopper circuit 12 is stopped.

It is to be noted that, also when the short-circuit fault occurs in the parallel bypass semiconductor switching element SWB3 (or SWB4) in place of the first diode D1 (or the second diode D2), the first series circuit SC1 (or the second series circuit SC2) remains to be in the short-circuit state, and thus, the voltage breakdown of the second capacitor C2 (or the first capacitor C1) can be prevented by the same operation as the above.

In order to protect the second capacitor C2 (or the first capacitor C1) from the voltage breakdown when the short-circuit fault occurs in the first series circuit SC1 (or the second series circuit SC2), the second semiconductor switching element SW2 and the bypass semiconductor switching element SWB4 (or the first semiconductor switching element SW1 and the bypass semiconductor switching element SWB3) undergo a voltage breakdown.

Thus, the second semiconductor switching element SW2 and the bypass semiconductor switching element SWB4 (or the first semiconductor switching element SW1 and the bypass semiconductor switching element SWB3), and the second diode D2 (or the first diode D1) are not used as one module (package). Accordingly, there is an advantage that the second diode D2 (or the first diode D1) needs not to be replaced when replacing the semiconductor switching elements SW2 and SWB4 (or SW1 and SWB3). In particular, when expensive wide-bandgap semiconductor, such as expensive SiC-SBD, is used as the first diode D1 and the second diode D2, the diodes D1 and D2 are housed in packages different from those of the semiconductor switching elements SW1, SWB3, and SW2, SWB4, so that unnecessary replacement needs not to be performed and it is economical.

It is to be noted that, although not illustrated in the drawing, the above-described fourth embodiment can be used as a bidirectional converter by inverse-parallel connecting the diodes to the semiconductor switching elements SW1 and SW2.

Next, a fifth embodiment of the present invention will be described with reference to FIG. 6.

In the fifth embodiment, the formation method of the bypass current paths of the series circuits is changed in the above-described fourth embodiment.

More specifically, the fifth embodiment has the same circuit configuration as the above-described fourth embodiment, but the first semiconductor switching element SW1 and the second semiconductor switching element SW2 are configured by semiconductor elements other than wide-bandgap semiconductor elements and are set to have withstand voltages lower than the withstand voltages of the first capacitor C1 and the second capacitor C2.

When detecting that the short-circuit fault occurs in the first series circuit SC1 (or the second series circuit SC2), the control device 24 controls the second semiconductor switching element SW2 (or the first semiconductor switching element SW1) to be in the off state.

According to the fifth embodiment, when the short-circuit fault occurs in the first series circuit SC1 (or the second series circuit SC2), the bypass semiconductor switching element SWB4 and the second semiconductor switching element SW2 of the second series circuit SC2 are controlled to be in the on state and the off state, respectively (or the bypass semiconductor switching element SWB3 and the first semiconductor switching element SW1 of the first series circuit SC1 are controlled to be in the on state and the off state, respectively).

Thus, since the second series circuit SC2 (or the first series circuit SC1) maintains a non-conduction state when the short-circuit fault occurs in the first series circuit SC1 (or the second series circuit SC2), the second capacitor C2 (or the first capacitor C1) is boosted by the series resonance current. However, the second semiconductor switching element SW2 (or the first semiconductor switching element SW1) is set to have a withstand voltage lower than the withstand voltage of the second capacitor C2 (or the first capacitor C1). Thus, when a drain voltage of the second semiconductor switching element SW2 (or the first semiconductor switching element SW1) reaches the withstand voltage, the second semiconductor switching element SW2 (or the first semiconductor switching element SW1) breaks down and becomes a conduction state. Therefore, the second series circuit SC2 (or the first series circuit SC1) becomes a conduction state, and a first bypass current path (or a second bypass current path) with respect to the second capacitor C2 (or the first capacitor C1) is formed. Accordingly, the voltage breakdown of the second capacitor C2 (or the first capacitor C1) can be prevented.

At this time, the bypass semiconductor switching element SWB4 (or the bypass semiconductor switching element SWB3) discharges the charge of the second capacitor C2 (or the first capacitor C1), and thus, a short-circuit breakdown sometimes occurs due to the exceeding of the short-circuit tolerance. However, since the energy of the bypass semiconductor switching element SWB4 (or SWB3) during the breakdown is much smaller than the energy of the capacitor during the breakdown, this can be allowed.

Then, the current from the DC power supply 11 is interrupted by the current breaker 21 including a fuse, and the power conversion device including the step-down chopper circuit 12 is stopped.

It is to be noted that, also when the short-circuit fault occurs in the parallel bypass semiconductor switching element SWB3 (or SWB4) in place of the first diode D1 (or the second diode D2), the first series circuit SC1 (or the second series circuit SC2) remains to be in the short-circuit state, and thus, the voltage breakdown of the second capacitor C2 (or the first capacitor C1) can be prevented by the same operation as the above.

The same operation and effect as the above-described fourth embodiment can be obtained also in the fifth embodiment.

Next, a sixth embodiment of the present invention will be described with reference to FIG. 7.

The sixth embodiment intends to prevent the voltage breakdown of the element that performs the normal operation when preventing the voltage breakdown of the capacitor due to the occurrence of the short-circuit fault.

Figure 7:
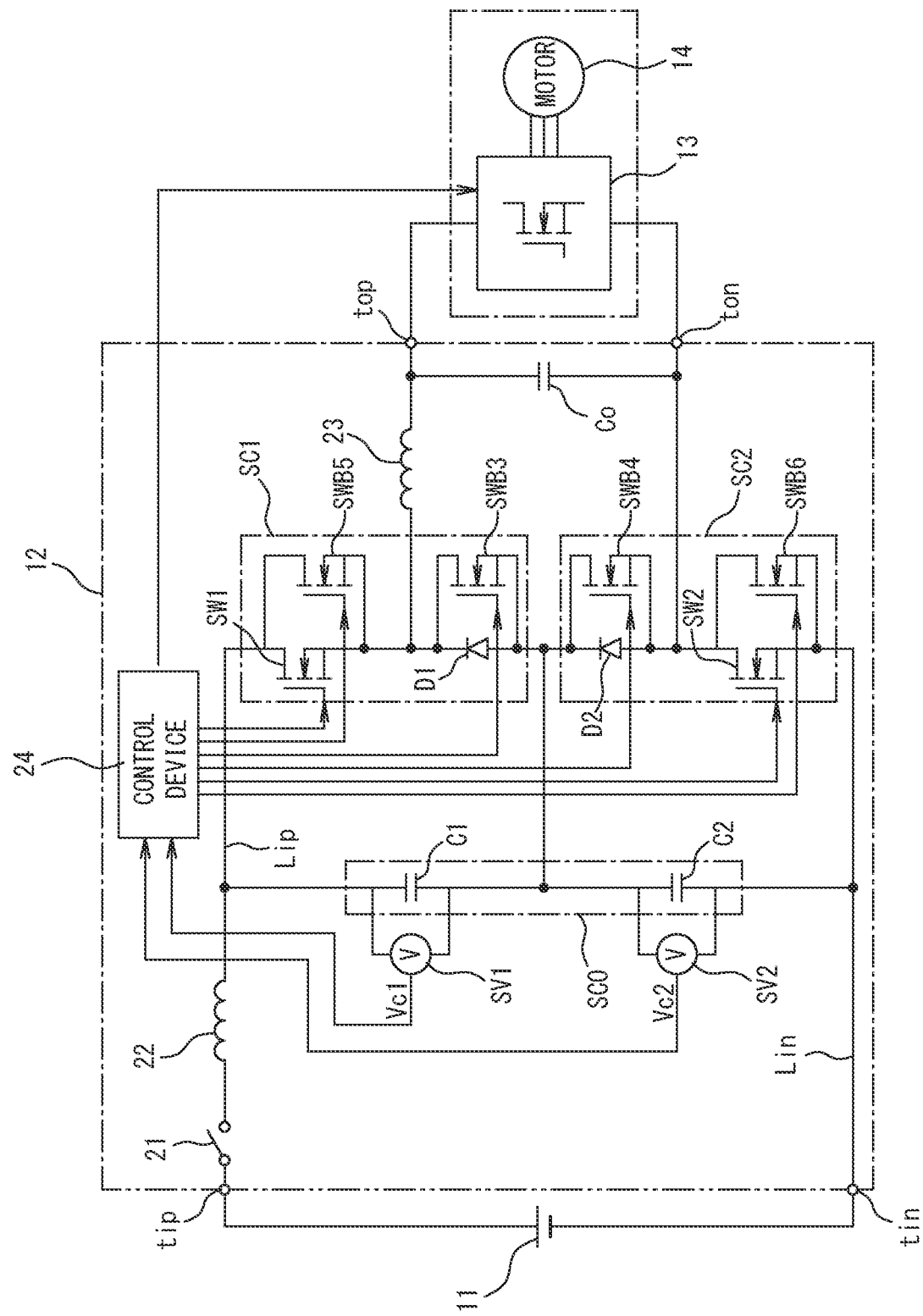
FIG. 7 is a circuit diagram illustrating a sixth embodiment of the power conversion device according to the present invention.

More specifically, as illustrated in FIG. 7, the sixth embodiment has a configuration in which bypass semiconductor switching elements SWB5 and SWB6 that are low-cost semiconductor switching elements other than wide-bandgap semiconductor elements are connected in parallel with the first semiconductor switching element SW1 and the second semiconductor switching element SW2 in the above-described fourth embodiment. The bypass semiconductor switching elements SWB3 to SWB6 are set to have withstand voltages higher than voltages reached by the voltage surge of the first semiconductor switching element SW1 and the second semiconductor switching element SW2, and the first diode D1 and the second diode D2 during the normal step-down chopper operation and are set such that there is no problem during the normal step-down chopper operation.

Since other configurations are the same as the configurations of the fifth embodiment, the corresponding parts to FIG. 6 are denoted by the same reference numerals, and the detailed description thereof will be omitted.

It is to be noted that gate terminals of the bypass semiconductor switching elements SWB3 to SWB6 are connected to the control device 24, all are controlled to be in the off state during the normal step-down chopper operation, and when the short-circuit fault of the first series circuit SC1 (or the second series circuit SC2) is detected, the bypass semiconductor switching elements SWB4 and SWB6 (or SWB3 and SWB5) are controlled to be in the on state.

According to the sixth embodiment, regarding the step-down chopper operation, the bypass semiconductor switching elements SWB3 to SWB6 are controlled to be in the off state by the control device 24, so that the same operation as the above-described first to fifth embodiments is performed.

At the start of or during the operation of the step-down chopper, when the short-circuit fault occurs in the first series circuit SC1 (or the second series circuit SC2), the second capacitor C2 (or the first capacitor C1) is boosted by the series resonance current in the same manner as the above-described first to fifth embodiments.

When the short-circuit fault is detected by the control device 24, the control device 24 controls the second semiconductor switching element SW2 and the bypass semiconductor switching elements SWB4 and SWB6 of the second series circuit SC2 to be in the off state and the on state, respectively (or controls the first semiconductor switching element SW1 and the bypass semiconductor switching elements SWB3 and SWB5 of the first series circuit SC1 to be in the off state and the on state, respectively).

Thus, the second series circuit SC2 becomes a conduction state by the bypass semiconductor switching elements SWB4 and SWB6 (or the first series circuit SC1 becomes a conduction state by the bypass semiconductor switching elements SWB3 and SWB5), and a first bypass current path (or a second bypass current path) with respect to the second capacitor C2 (or the first capacitor C1) is formed. Accordingly, the boost of the second capacitor C2 (or the first capacitor C1) is stopped, and the charge is discharged. Thus, the voltage breakdown of the second capacitor C2 (or the first capacitor C1) can be prevented.

At this time, the bypass semiconductor switching elements SWB4 and SWB6 (or SWB3 and SWB5) discharge the charge of the second capacitor C2 (or the first capacitor C1), and thus, a short-circuit breakdown sometimes occurs due to the exceeding of the short-circuit tolerance. However, since the energy of the bypass semiconductor switching elements SWB4 and SWB6 (or SWB3 and SWB5) during the breakdown is much smaller than the energy of the capacitor during the breakdown, this can be allowed.

Then, the current from the DC power supply 11 is interrupted by the current breaker 21 including a fuse, and the power conversion device including the step-down chopper circuit 12 is stopped.

It is to be noted that, also when the short-circuit fault occurs in the parallel bypass semiconductor switching element SWB3 or SWB5 (or SWB4 or SWB6) in place of the first semiconductor switching element SW1 (or the second semiconductor switching element SW2) or the first diode D1 (or the second diode D2), the first series circuit SC1 (or the second series circuit SC2) remains to be in the short-circuit state, and thus, the voltage breakdown of the second capacitor C2 (or the first capacitor C1) can be prevented by the same operation as the above.

The same operation and effect as the above-described fifth embodiment can be obtained also in the sixth embodiment, and moreover, the first semiconductor switching element SW1, the first diode D1, the second semiconductor switching element SW2, and the second diode D2 used during the normal step-down chopper operation do not undergo a voltage breakdown. Thus, inexpensive semiconductor different from the first semiconductor switching element SW1 and the second semiconductor switching element SW2 configured by wide-bandgap semiconductor for use as a high-performance step-down chopper can be applied. Furthermore, the bypass semiconductor switching elements SWB3 and SWB5, and SWB4 and SWB6 are housed in packages different from those of the first semiconductor switching element SW1 and the second semiconductor switching element SW2, so that the inexpensive bypass semiconductor switching elements SWB3 and SWB5 (or SWB4 and SWB6) only have to be replaced, a replacement cost can be reduced, and a replacement operation also becomes easy.

Next, a seventh embodiment of the present invention will be described with reference to FIG. 8.

The seventh embodiment is configured such that the bypass paths of the capacitors are formed across the first series circuit and the second series circuit.

Figure 8:
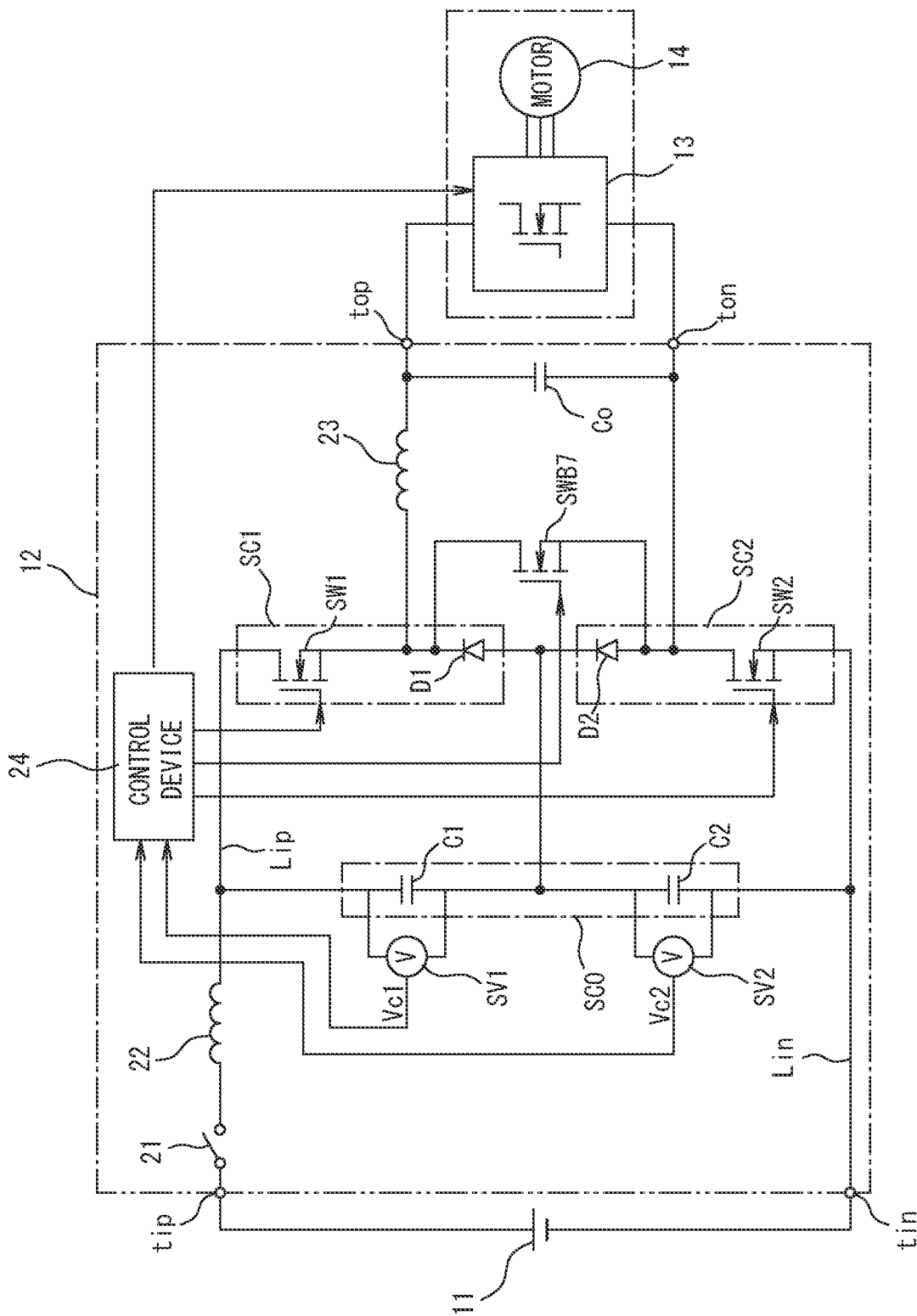
FIG. 8 is a circuit diagram illustrating a seventh embodiment of the power conversion device according to the present invention.

More specifically, as illustrated in FIG. 8, the seventh embodiment has a configuration in which a bypass semiconductor switching element SWB7 is connected between a connection point of the first semiconductor switching element SW1 and the first diode D1 of the first series circuit SC1 and a connection point of the second semiconductor switching element SW2 and the second diode D2 of the second series circuit SC2 in the above-described first embodiment.

The bypass semiconductor switching element SWB7 is configured by semiconductor other than wide-bandgap semiconductor and is set to have a withstand voltage higher than voltages reached by the voltage surge of the first diode D1 and the second diode D2 during the normal step-down chopper operation, and there is no problem during the normal step-down chopper operation.

A gate terminal of the bypass semiconductor switching element SWB7 is connected to the control device 24, and the bypass semiconductor switching element SWB7 is controlled to be in the off state during the normal step-down chopper operation and, when the short-circuit fault of the first series circuit SC1 or the second series circuit SC2 is detected, is controlled to be in the on state.

Other configurations are the same as the configurations of the first embodiment, the corresponding parts to FIG. 1 are denoted by the same reference numerals, and the detailed description thereof will be omitted.

According to the seventh embodiment, the bypass semiconductor switching element SWB7 is controlled to be in the off state during the normal step-down chopper operation, so that the exact same configuration as the above-described first embodiment is obtained, and the same operation as the first embodiment is performed.

When the short-circuit fault occurs in the first series circuit SC1 (or the second series circuit SC2) during the normal step-down chopper operation or at the start of the step-down chopper operation, the series resonance current flows into the second capacitor C2 (or the first capacitor C1) in the same manner as the first embodiment. Thus, the second capacitor C2 (or the first capacitor C1) is boosted.

The inter-terminal voltage Vc2 (or Vc1) of the second capacitor C2 (or the first capacitor C1) is detected by the voltage sensor SV2 (or SV1) to be supplied to the control device 24. When detecting that the inter-terminal voltage Vc2 (or Vc1) becomes the preset set value or more and the short-circuit fault occurs in the first series circuit SC1 (or the second series circuit SC2), the control device 24 controls the bypass semiconductor switching element SWB7 and the second semiconductor switching element SW2 (or the first semiconductor switching element SW1) to be in the on state.

Accordingly, a first bypass current path (or a second bypass current path) with respect to the second capacitor C2 (or the first capacitor C1) via the first semiconductor switching element SW1 of the first series circuit SC1 in which the short-circuit fault occurs, the bypass semiconductor switching element SWB7, and the second semiconductor switching element SW2 is formed. Thus, the supply of the series resonance current to the second capacitor C2 (or the first capacitor C1) is stopped, and the charge of the second capacitor C2 (or the first capacitor C1) is discharged. Therefore, the voltage breakdown of the second capacitor C2 (or the first capacitor C1) is prevented.

At this time, the bypass semiconductor switching element SWB7 and the second semiconductor switching element SW2 (or the first semiconductor switching element SW1) discharge the charge of the second capacitor C2 (or the first capacitor C1), and thus, a short-circuit breakdown sometimes occurs due to the exceeding of the short-circuit tolerance. However, since the energy of the bypass semiconductor switching element SWB7 and the second semiconductor switching element SW2 (or the first semiconductor switching element SW1) during the breakdown is much smaller than the energy of the capacitor during the breakdown, this can be allowed.

Then, the current from the DC power supply 11 is interrupted by the current breaker 21 including a fuse, and the power conversion device including the step-down chopper circuit 12 is stopped.

In the seventh embodiment, since the bypass semiconductor switching element SWB7 is an element that is not used in the normal step-down chopper operation, inexpensive semiconductor different from the first semiconductor switching element SW1 and the second semiconductor switching element SW2 for use as a high-performance chopper can be used. Furthermore, the bypass current paths with respect to the first capacitor C1 and the second capacitor C2 can be formed by the common bypass semiconductor switching element SWB7, and the bypass paths can be formed by a small number of the semiconductor elements.

The second semiconductor switching element SW2 (or the first semiconductor switching element SW1) undergoes a short-circuit breakdown during the short-circuit fault. Thus, the second semiconductor switching element SW2 (or the first semiconductor switching element SW1) and the second diode D2 (or the first diode D1) are not used as one module, so that there is an advantage that the second diode D2 (or the first diode D1) needs not to be replaced when replacing the second semiconductor switching element SW2 (or the first semiconductor switching element SW1). In particular, when expensive wide-bandgap semiconductor, such as SiC-SBD, is used as the diodes D1 and D2, the diodes D1 and D2 are housed in packages different from those of the semiconductor switching elements SW1 and SW2, so that unnecessary replacement needs not to be performed and it is economical.

It is to be noted that, in the above-described seventh embodiment, the case where the second semiconductor switching element SW2 (or the first semiconductor switching element SW1) is controlled to be in the on state during the short-circuit fault of the first series circuit SC1 (or the second series circuit SC2) has been described. However, the present invention is not limited to the above-described configuration, the withstand voltages of the first semiconductor switching element SW1 and the second semiconductor switching element SW2 may be set to be lower than the withstand voltages of the first capacitor C1 and the second capacitor C2, and the second semiconductor switching element SW2 (or the first semiconductor switching element SW1) may be made to be in off state during the short-circuit fault of the first series circuit SC1 (or the second series circuit SC2).

In this case, when the series resonance current is supplied to the second capacitor C2 (or the first capacitor C1) and the inter-terminal voltage Vc2 (or Vc1) is boosted to reach the withstand voltage of the second semiconductor switching element SW2 (or the first semiconductor switching element SW1), the second semiconductor switching element SW2 (or the first semiconductor switching element SW1) breaks down, a short-circuit breakdown occurs, and the bypass current path with respect to the second capacitor C2 (or the first capacitor C1) is formed. Accordingly, the voltage breakdown of the second capacitor C2 (or the first capacitor C1) can be prevented.

Next, an eighth embodiment of the present invention will be described with reference to FIG. 9.

In the eighth embodiment, the bypass semiconductor switching element of the above-described seventh embodiment is replaced with a bypass diode.

Figure 9:
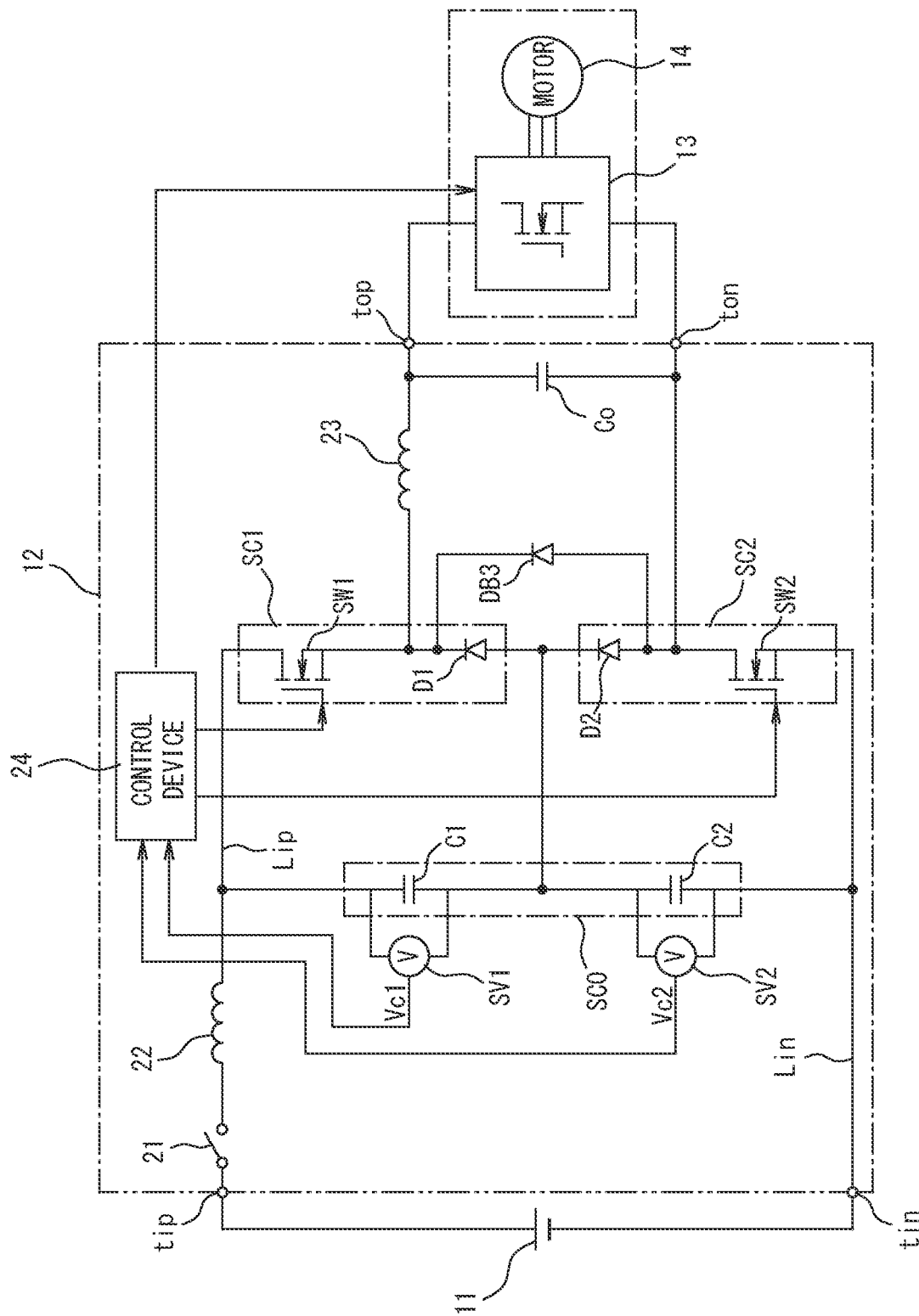
FIG. 9 is a circuit diagram illustrating an eighth embodiment of the power conversion device according to the present invention.

More specifically, as illustrated in FIG. 9, the eighth embodiment has a configuration in which the bypass semiconductor switching element SWB7 in the seventh embodiment is omitted and a bypass diode DB3 is connected in parallel with the first diode D1 and the second diode D2 instead thereof. Here, the bypass diode DB3 is set to have a withstand voltage higher than the voltages reached by the voltage surge of the first diode D1 and the second diode D2 during the normal step-down chopper operation but lower than the withstand voltages of the first capacitor C1 and the second capacitor C2. Thus, there is no problem for the normal step-down chopper operation.

Other configurations are the same as the configurations of the first and seventh embodiments, the corresponding parts to FIG. 1 and FIG. 8 are denoted by the same reference numerals, and the detailed description thereof will be omitted.

According to the eighth embodiment, when both the first semiconductor switching element SW1 and the second semiconductor switching element SW2 are made to be in the off state in the normal step-down chopper operation, a current that flows in the chopper reactor 23 continues to flow due to resonance with the output capacitor Co. Thus, a forward current flows in the bypass diode DB3, and when the first semiconductor switching element SW1 or the second semiconductor switching element SW2 becomes the on state, a reverse recovery current flows. In the case of without an operation for making both the first semiconductor switching element SW1 and the second semiconductor switching element SW2 be in the off state, i.e. in the case of an operation in a range where an output voltage is larger than the voltage of the first capacitor C1 (or the second capacitor C2), a current does not flow in the bypass diode DB3, and there is no influence on the operation.

When the short-circuit fault occurs in the first series circuit SC1 (or the second series circuit SC2) and the control device 24 detects the short-circuit fault of the first series circuit SC1 (or the second series circuit SC2), the control device 24 controls the second semiconductor switching element SW2 (or the first semiconductor switching element SW1) to be in the on state.

In this state, since a current does not flow in the bypass diode DB3, the series resonance current is supplied to the second capacitor C2 (or the first capacitor C1) via the first series circuit SC1 (or the second series circuit SC2). Thus, the inter-terminal voltage Vc2 (or Vc1) of the second capacitor C2 (or the first capacitor C1) is boosted.

Then, when a cathode voltage of the bypass diode DB3 reaches the withstand voltage, the bypass diode DB3 breaks down, and a short-circuit breakdown occurs. Thus, a first bypass current path (or a second bypass current path) with respect to the second capacitor C2 (or the first capacitor C1) via the bypass diode DB3 and the second semiconductor switching element SW2 (or the first semiconductor switching element SW1) is formed.

Accordingly, the boost of the second capacitor C2 (or the first capacitor C1) is stopped, and discharge of the charge is started. Thus, the voltage breakdown of the second capacitor C2 (or the first capacitor C1) is prevented.

At this time, the second semiconductor switching element SW2 (or the first semiconductor switching element SW1) discharges the charge of the second capacitor C2 (or the first capacitor C1), and thus, a short-circuit breakdown sometimes occurs due to the exceeding of the short-circuit tolerance. However, since the energy of the second semiconductor switching element SW2 (or the first semiconductor switching element SW1) during the breakdown is much smaller than the energy of the capacitor during the breakdown, this can be allowed.

Then, the current from the DC power supply 11 is interrupted by the current breaker 21 including a fuse, and the power conversion device including the step-down chopper circuit 12 is stopped.

Also in the eighth embodiment, the bypass current paths with respect to the first capacitor C1 and the second capacitor C2 can be formed by one bypass diode DB3 in the same manner as the seventh embodiment.

It is to be noted that a semiconductor switching element having an equivalent withstand voltage can be applied in place of the bypass diode DB3. In this case, by controlling the semiconductor switching element to be in the off state, an equivalent function to the bypass diode DB3 can be exerted.

Next, a ninth embodiment of the present invention will be described with reference to FIG. 10.

The ninth embodiment is configured such that new bypass current paths are formed in parallel with the capacitors instead of forming the bypass current paths in the first series circuit and the second series circuit.

Figure 10:
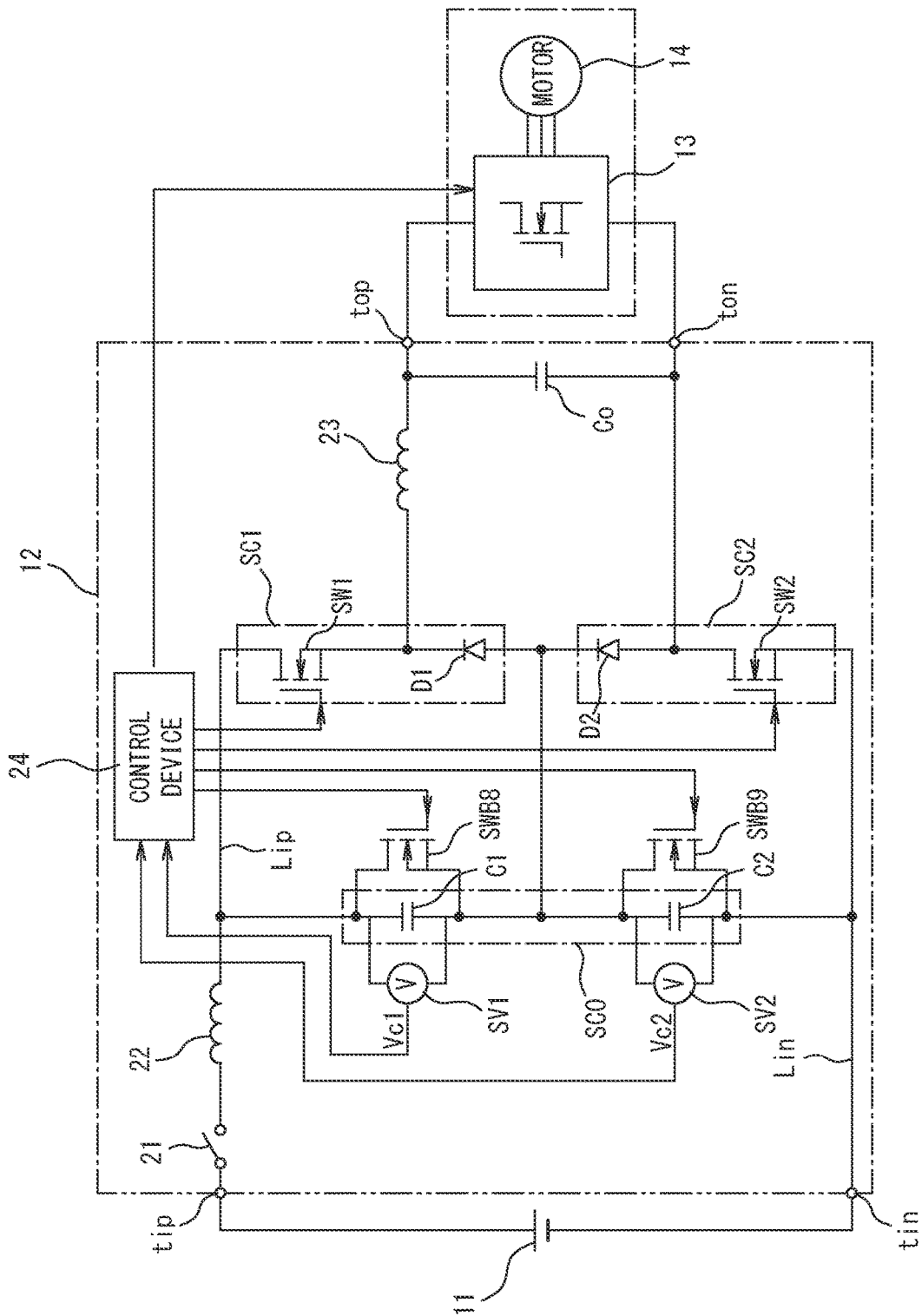
FIG. 10 is a circuit diagram illustrating a ninth embodiment of the power conversion device according to the present invention.

More specifically, in the ninth embodiment, as illustrated in FIG. 10, a bypass semiconductor switching element SWB8 configured to form a second bypass current path is connected in parallel with the first capacitor C1 and a bypass semiconductor switching element SWB9 configured to form a first bypass current path is connected in parallel with the second capacitor C2 in the configuration in the above-described first embodiment.

Gates of the bypass semiconductor switching elements SWB8 and SWB9 are connected to the control device 24, the bypass semiconductor switching elements SWB8 and SWB9 are controlled to be in the off state during the normal step-down chopper operation, and when the short-circuit fault of the first series circuit SC1 (or the second series circuit SC2) is detected, the bypass semiconductor switching element SWB9 (or SWB8) is controlled to be in the on state. At this time, the first semiconductor switching element SW1 and the second semiconductor switching element SW2 are controlled to be in the off state.

Other configurations are the same as the configurations of the first embodiment, the corresponding parts to FIG. 1 are denoted by the same reference numerals, and the detailed description thereof will be omitted.

According to the ninth embodiment, the bypass semiconductor switching elements SWB8 and SWB9 are controlled to be in the off state during the normal step-down chopper operation, so that the same configuration as the first embodiment is obtained, and the same step-down chopper operation as the first embodiment is performed.

When the short-circuit fault occurs in the first series circuit SC1 (or the second series circuit SC2) during the step-down chopper operation or at the start of the step-down chopper operation, the series resonance current is supplied to the second capacitor C2 (or the first capacitor C1) in the same manner as the first embodiment. Thus, the second capacitor C2 (or the first capacitor C1) is boosted.

When the short-circuit fault of the first series circuit SC1 (or the second series circuit SC2) is detected by the control device 24, the second semiconductor switching element SW2 (or the first semiconductor switching element SW1) is controlled to be in the off state, and the bypass semiconductor switching element SWB9 (or SWB8) is controlled to be in the on state. Thus, the series resonance current that has supplied to the second capacitor C2 (or the first capacitor C1) flows via the bypass semiconductor switching element SWB9 (or SWB8), the supply of the series resonance current to the second capacitor C2 (or the first capacitor C1) is stopped, and the charge of the second capacitor C2 (or the first capacitor C1) is discharged via the bypass semiconductor switching element SWB9 (or SWB8).

Therefore, the voltage breakdown of the second capacitor C2 (or the first capacitor C1) can be prevented.

At this time, the bypass semiconductor switching element SWB9 (or SWB8) discharges the charge of the second capacitor C2 (or the first capacitor C1), and thus, a short-circuit breakdown sometimes occurs due to the exceeding of the short-circuit tolerance, or the current from the DC power supply 11 increases due to the short circuit, thereby sometimes leading to a breakdown due to the exceeding of the short-circuit tolerance.

However, since the energy of the bypass semiconductor switching elements SWB8 and SWB9 during the breakdown is much smaller than the energy of the capacitor during the breakdown, this can be allowed. Then, the current from the DC power supply 11 is interrupted by the current breaker 21 including a fuse, and the power conversion device including the step-down chopper circuit 12 is stopped.

Figure 11:
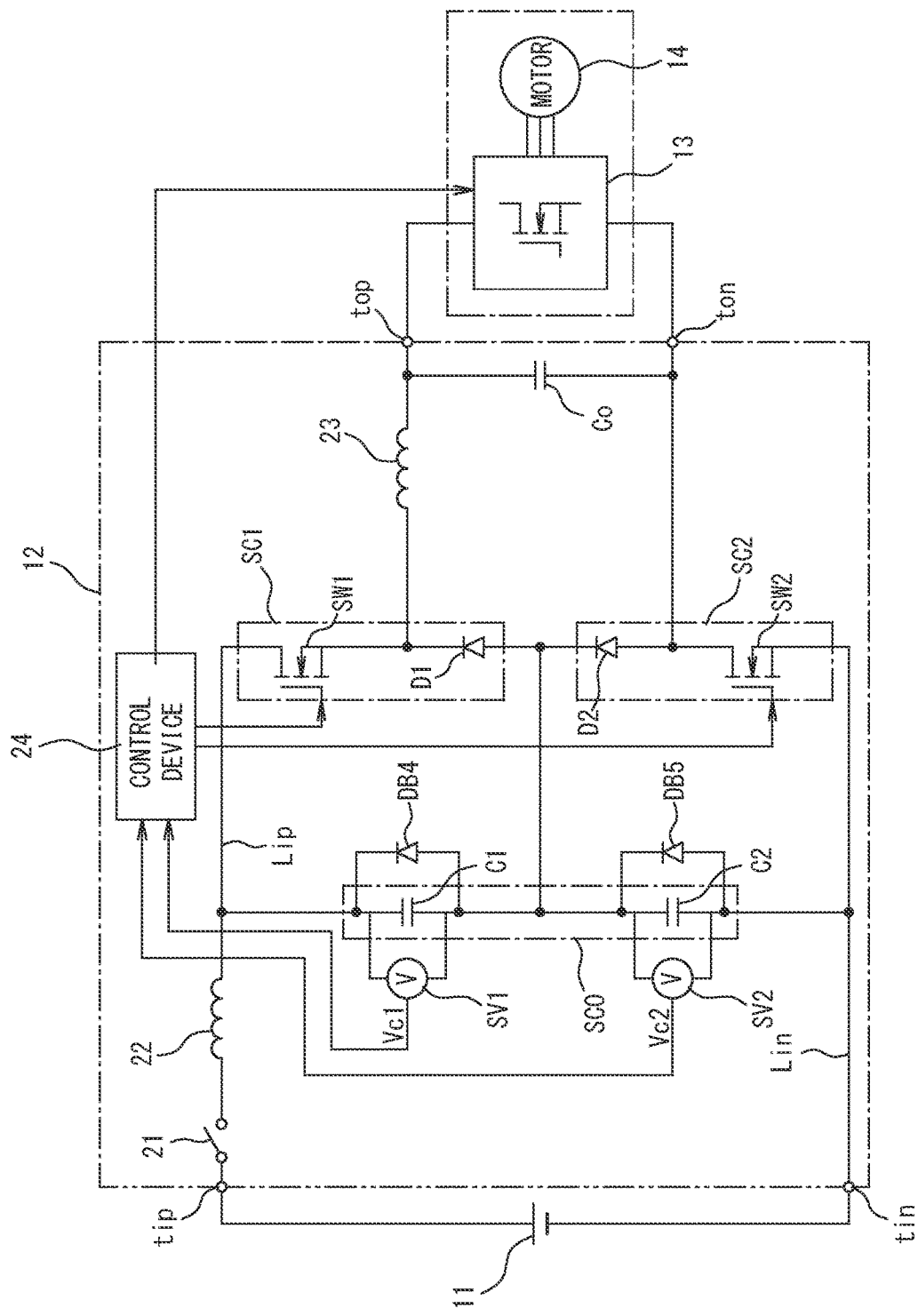
FIG. 11 is a circuit diagram illustrating a modified example of the ninth embodiment.

It is to be noted that, in the above-described ninth embodiment, the case where the bypass semiconductor switching elements SWB8 and SWB9 are separately connected to the first capacitor C1 and the second capacitor C2 has been described, but the present invention is not limited thereto. For example, as illustrated in FIG. 11, bypass diodes DB4 and DB5 set to have withstand voltages lower than the withstand voltages of the first capacitor C1 and the second capacitor C2 may be connected such that passage of the charge current into the capacitors is prevented in place of the bypass semiconductor switching elements SWB8 and SWB9.

In this case, when the short-circuit fault occurs in the first series circuit SC1 (or the second series circuit SC2), the series resonance current is supplied to the second capacitor C2 (or the first capacitor C1) and the second capacitor C2 (or the first capacitor C1) is boosted, but when the inter-terminal voltage of the second capacitor C2 (or the first capacitor C1) reaches the withstand voltage of the bypass diode DB5 (or DB4), the bypass diode DB5 (or DB4) breaks down. Accordingly, a first bypass current path (or a second bypass current path) is formed in the bypass diode DB5 (or DB4), and the series resonance current to the second capacitor C2 (or the first capacitor C1) is bypassed. Therefore, the voltage breakdown of the second capacitor C2 (or the first capacitor C1) can be prevented.

At this time, the bypass diode DB5 (or DB4) undergoes a voltage breakdown, but since the energy of the diode during the breakdown is much smaller than the energy of the capacitor during the breakdown, this can be allowed.

Then, the current from the DC power supply 11 is interrupted by the current breaker 21 including a fuse, and the power conversion device including the step-down chopper circuit 12 is stopped.

It is to be noted that, in the above-described ninth embodiment, the bypass switching element SWB8 or the bypass diode DB4 is connected in parallel with the first capacitor C1, and the bypass switching element SWB9 or the bypass diode DB5 is connected in parallel with the second capacitor C2. However, the present invention is not limited to the above-described configuration, and for example, by forming a bypass current path in parallel with the first capacitor C1 and forming a bypass current path of one of the first to sixth embodiments in the first series circuit SC1, a bypass current path of the second series circuit SC2 may be omitted. Conversely, by forming a bypass current path in parallel with the second capacitor C2 and forming a bypass current path of one of the first to sixth embodiments in the second series circuit SC2, a bypass current path of the first series circuit SC1 may be omitted. In this case, a bypass current path only has to be formed in one of the upper arm side and the lower arm side.

Although the first to ninth embodiments of the present invention have been described above, the present invention is not limited thereto, and various changes and modifications can be made.

For example, the determination of the short-circuit fault of the first series circuit SC1 and the second series circuit SC2 is not limited to the case where the inter-terminal voltages Vc1 and Vc2 of the first capacitor C1 and the second capacitor C2 detected by the voltage sensors SV1 and SV2 are compared to the set values.

For example, a voltage difference ±ΔV between the inter-terminal voltage Vc1 of the first capacitor C1 and the inter-terminal voltage Vc2 of the second capacitor C2 is calculated by the control device 24, and it may be determined that the short-circuit fault occurs in the first series circuit SC1 or the second series circuit SC2 when an absolute value of the voltage difference ±ΔV becomes a preset set value or more.

Figure 12:
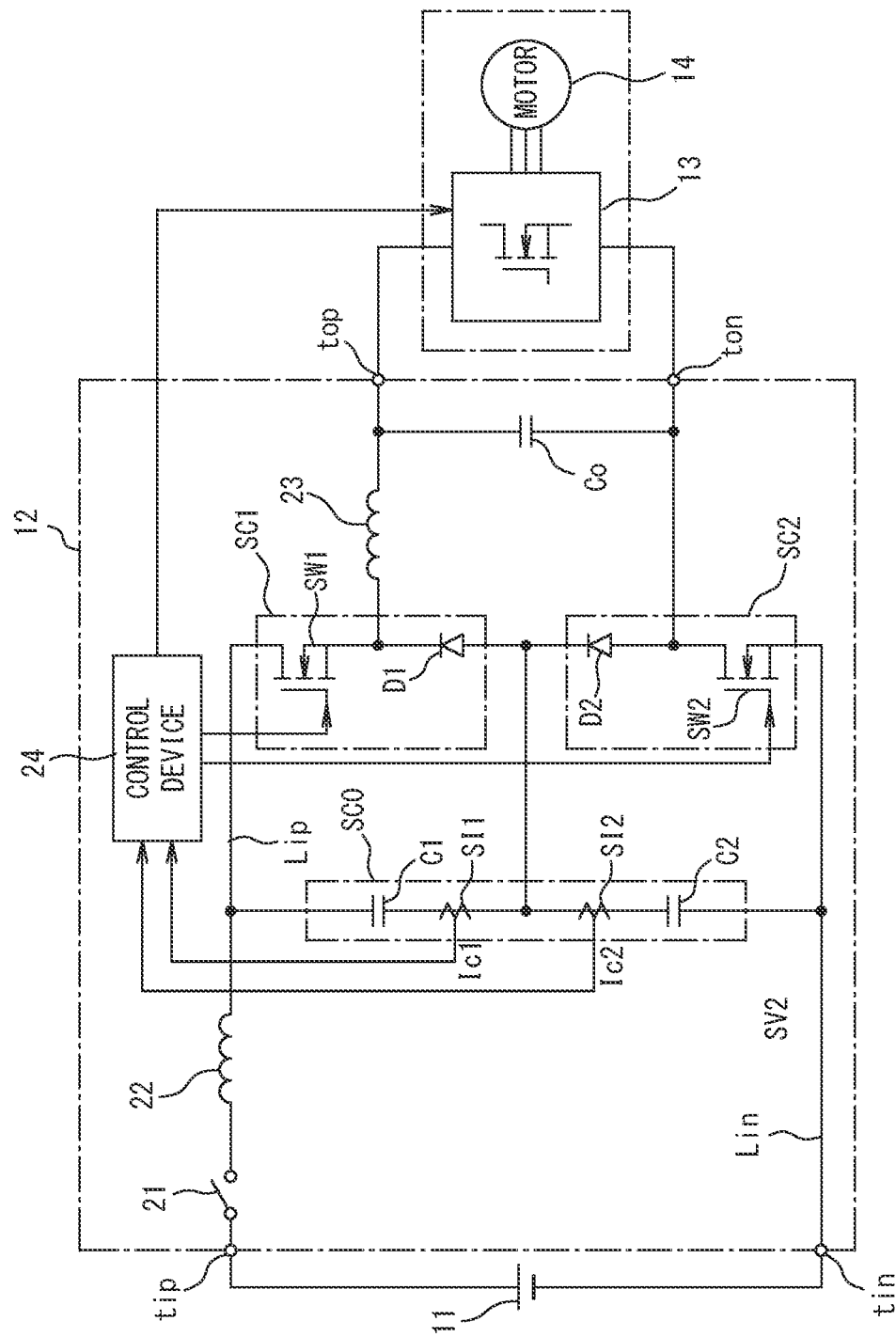
FIG. 12 is a circuit diagram illustrating a first modified example of a short-circuit determination sensor.

In addition, as illustrated in FIG. 12, a current sensor SI1 configured to detect a current flowing in the first capacitor C1 and a current sensor SI2 configured to detect a current flowing in the second capacitor C2 are provided, and it can be detected that the short-circuit fault occurs in the second series circuit SC2 and the first series circuit SC1 when currents Ic1 and Ic2 detected by the current sensors SI1 and SI2 become a preset set value or more.

Figure 13:
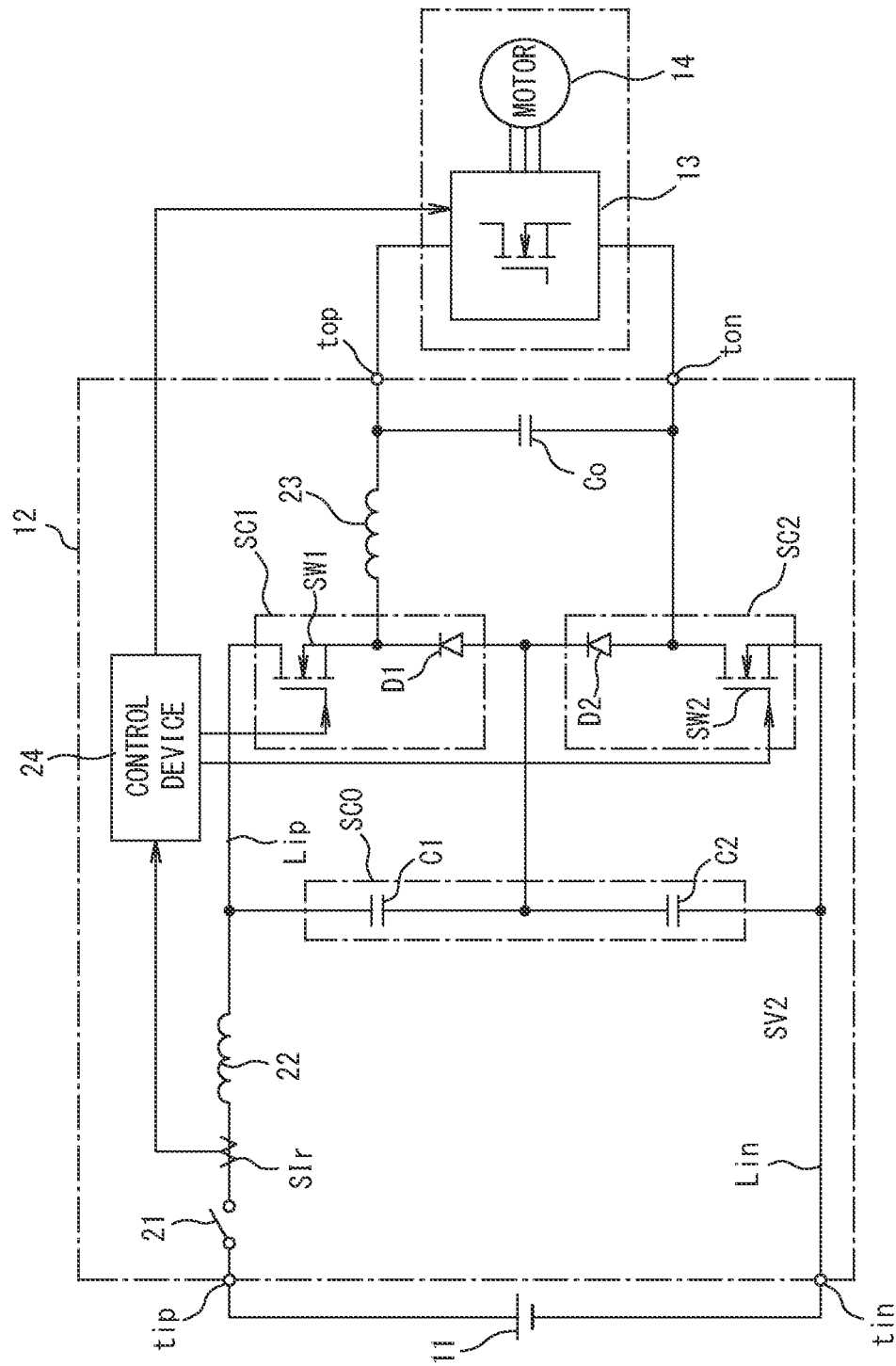
FIG. 13 is a circuit diagram illustrating a second modified example of the short-circuit determination sensor.

Furthermore, as illustrated in FIG. 13, a current Ifr flowing in the filter reactor 22 is detected by a current sensor SIr, it is determined that the series resonance current flows in the filter reactor 22 when the detected current Ifr is a preset set value or more, and the short-circuit fault of the first series circuit SC1 or the second series circuit SC2 can be detected.

Figure 14:
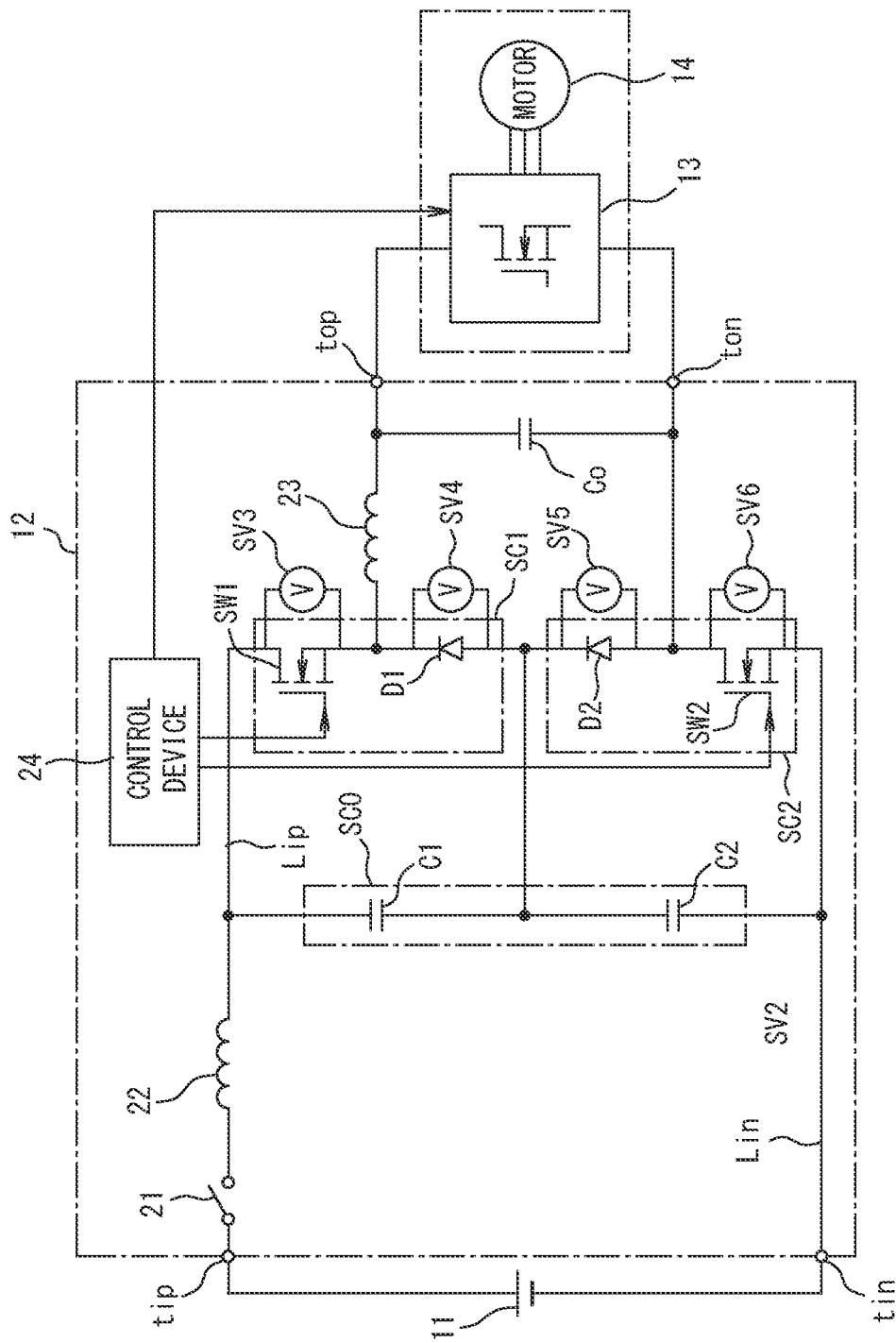
FIG. 14 is a circuit diagram illustrating a third modified example of the short-circuit determination sensor.

In addition, as illustrated in FIG. 14, voltage sensors SV3 to SV6 configured to detect inter-terminal voltages for the first semiconductor switching element SW1, the first diode D1, the second diode D2, and the second semiconductor switching element SW2, respectively, are provided, it can be detected that the short-circuit fault occurs in the first series circuit SC1 when the inter-terminal voltages detected by the respective voltage sensors SV3 and SV4 become substantially zero, and it can be detected that the short-circuit fault occurs in the second series circuit SC2 when the inter-terminal voltages detected by the voltage sensors SV5 and SV6 become substantially zero.

Figure 15:
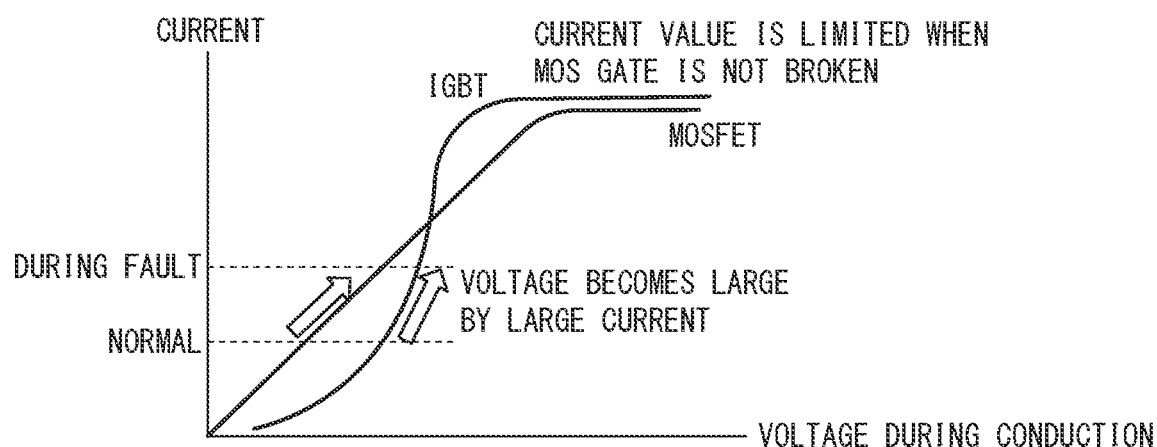
FIG. 15 is an explanatory diagram illustrating a short-circuit fault determination example using the short-circuit determination sensor of FIG. 14.

In this case, when the inter-terminal voltages of the first semiconductor switching element SW1 and the second semiconductor switching element SW2 during conduction are larger than zero, as illustrated in FIG. 15, although gates of MOSFETs are not broken, a large current flows. When the gates of the MOSFETs are not broken, since the current is saturated, a resonance circuit is not simply formed, but a predetermined value is determined by assuming that charge can proceed until exceeding the withstand voltages of the capacitors, so that the short-circuit fault can be determined from the inter-terminal voltages. In particular, more detailed determination becomes possible by a combination of a state (operating state) of the control terminals described below.

Figure 16:
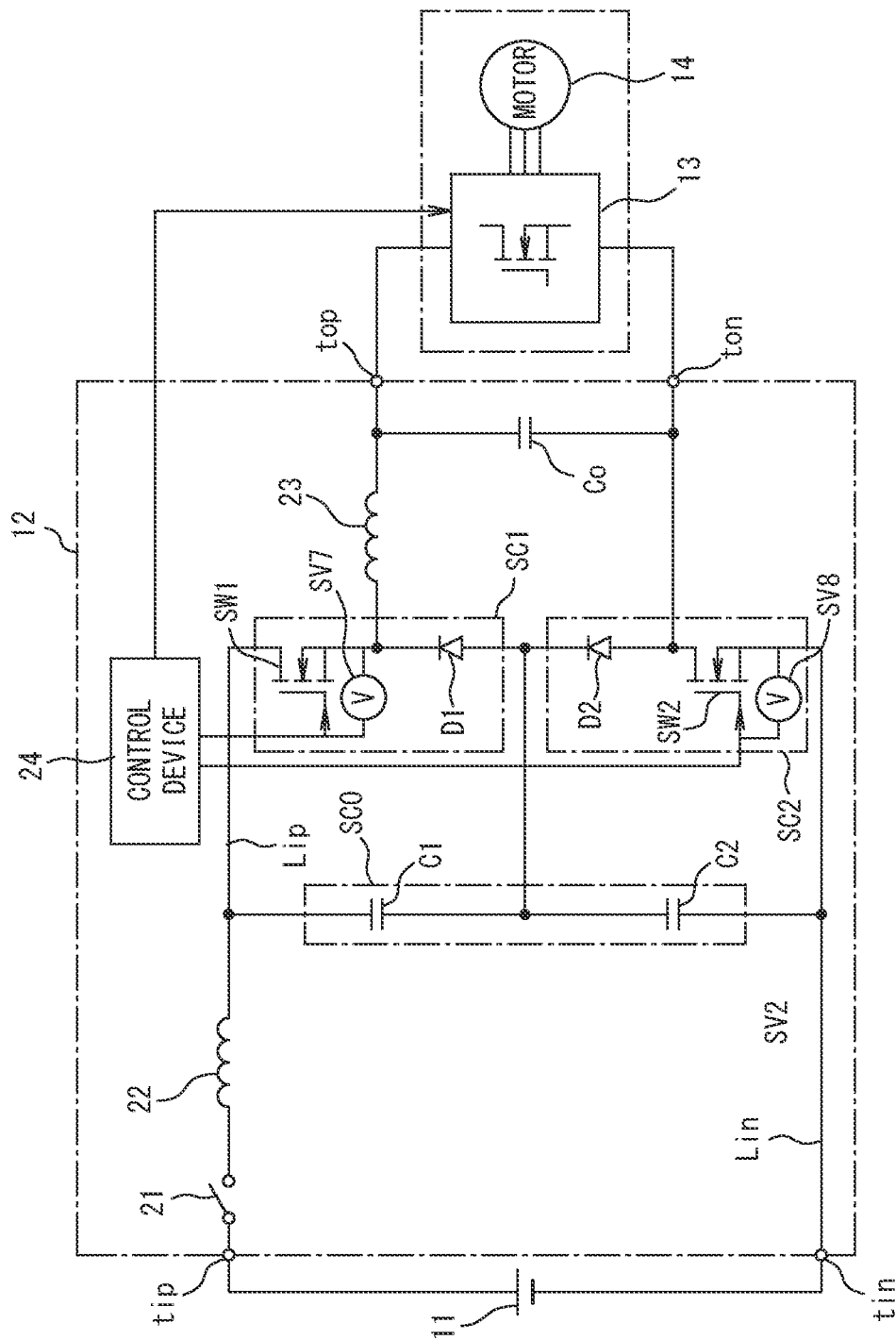
FIG. 16 is a circuit diagram illustrating a fourth modified example of the short-circuit determination sensor.

In addition, as illustrated in FIG. 16, a gate-source voltage of the first semiconductor switching element SW1 is detected by a voltage sensor SV7 and a gate-source voltage of the second semiconductor switching element SW2 is detected by a voltage sensor SV8. When the gate-source voltages keep a predetermined value or more, a current continues to flow in the first semiconductor switching element SW1 and the second semiconductor switching element SW2 and therefore, the short circuit of the semiconductor switching elements SW1 and SW2 can be determined. In this case, since the current is saturated in gates of MOSFETs, a resonance circuit is not simply formed, but it is considered that the predetermined value is determined by assuming the exceeding of the withstand voltages of the capacitors.

Figure 17:
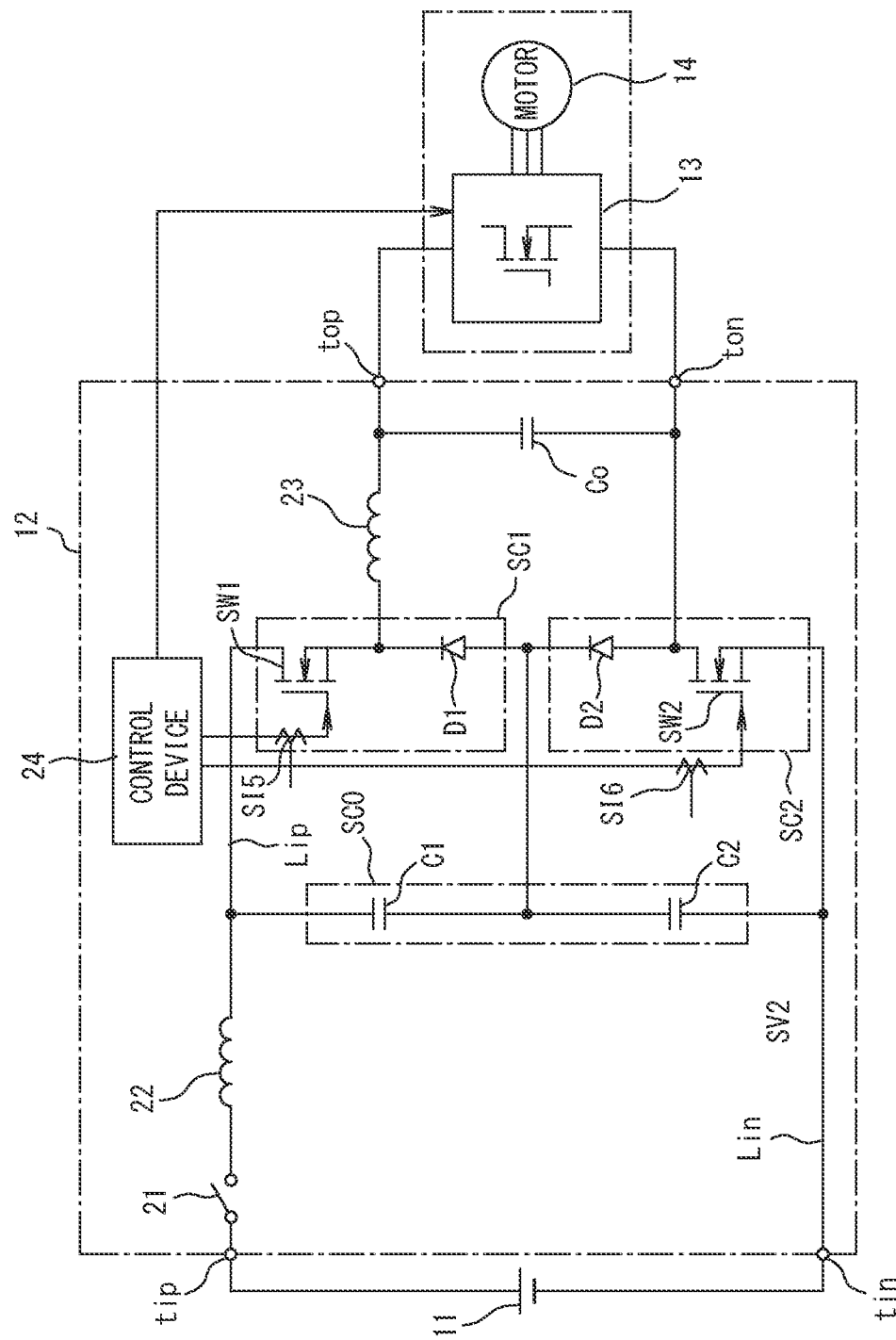
FIG. 17 is a circuit diagram illustrating a fifth modified example of the short-circuit determination sensor.

In addition, when the semiconductor switching element SW1 or SW2 then exceeds the short-circuit tolerance and between the drain and the source becomes a short-circuit state, a resonance circuit is simply formed, and the capacitors may reach the withstand voltages. Alternatively, when the gate-source voltage keeps a predetermined voltage or less, it is determined that the short-circuit fault occurs between the gate and the source in the semiconductor switching element SW1 or SW2, and it can also be determined that this is due to the short-circuit fault between the drain and the source in some cases. Alternatively, as illustrated in FIG. 17, by detecting a gate current Ig with current sensors SI5 and SI6, the short-circuit fault of the semiconductor switching element SW1 and SW2 can be detected.

Figure 18:
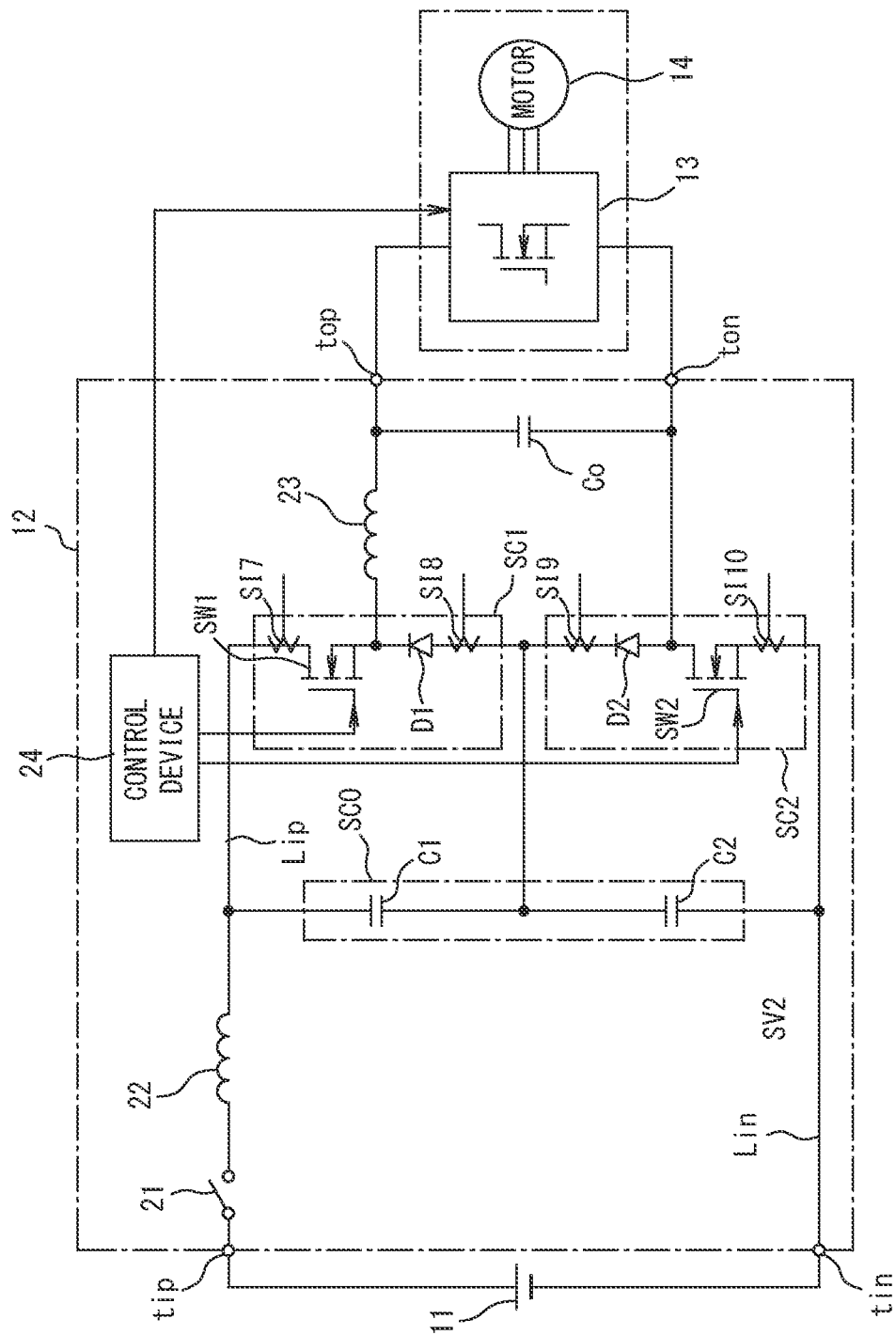
FIG. 18 is a circuit diagram illustrating a sixth modified example of the short-circuit determination sensor.

In addition, as illustrated in FIG. 18, by separately detecting currents flowing in the first semiconductor switching element SW1, the first diode D1, the second diode D2, and the second semiconductor switching element SW2 with current sensors SI7 to SI10, the short-circuit fault of each element can be detected.

In the semiconductor switching elements SW1 and SW2, the short-circuit fault can be determined when a current of a predetermined value or more flows. Accordingly, the possibility of the voltage breakdown of the other capacitor can be determined.

Figure 19:
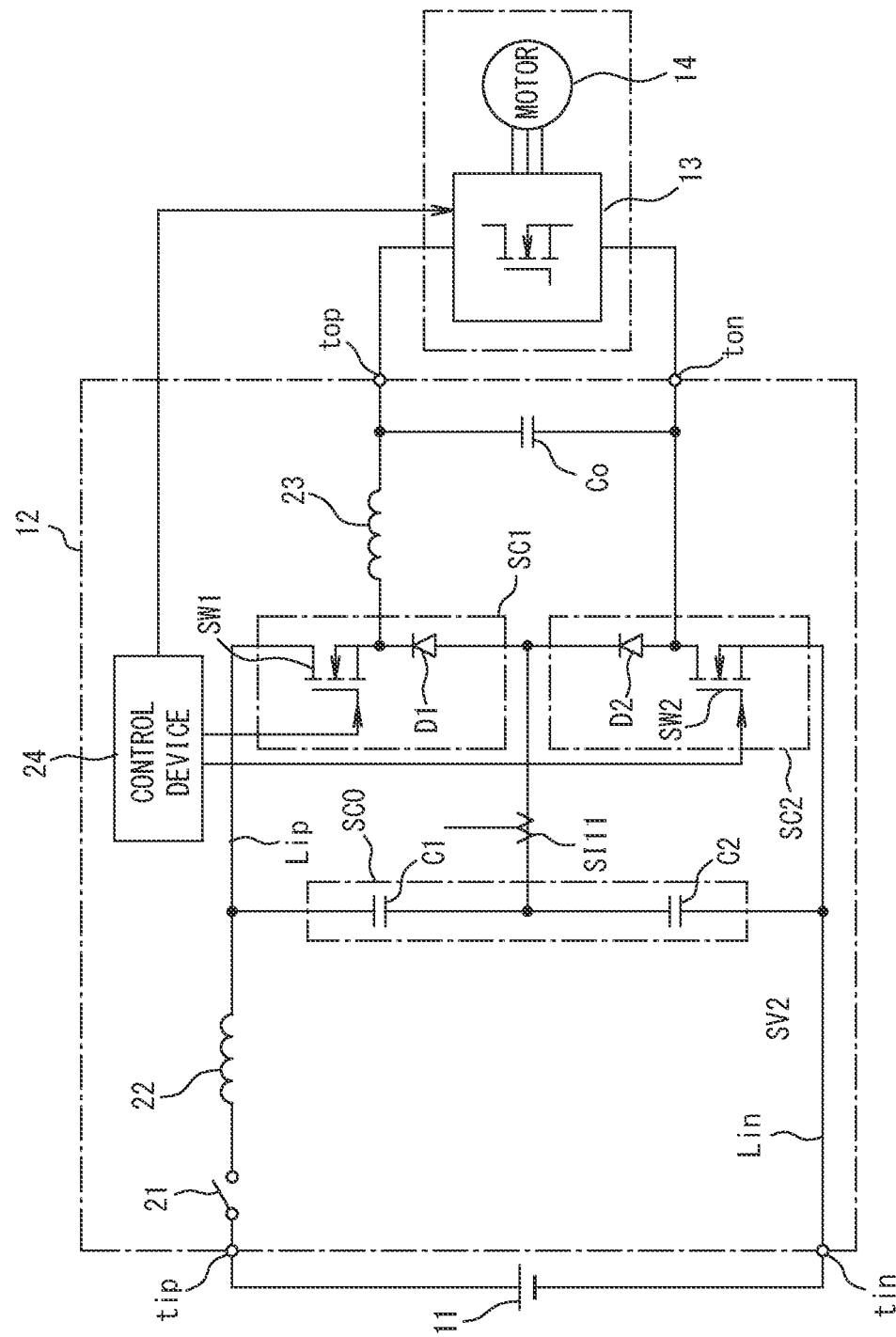
FIG. 19 is a circuit diagram illustrating a seventh modified example of the short-circuit determination sensor.

Furthermore, as illustrated in FIG. 19, by detecting a current between a connection point of the first capacitor C1 and the second capacitor C2 and a connection point of the first diode D1 and the second diode D2 with a current sensor SI11, the short-circuit fault of the first series circuit SC1 or the second series circuit SC2 can be detected when the current exceeds a predetermined value. In this case, the short-circuit fault of the first series circuit SC1 and the second series circuit SC2 can be detected by adding determination of a direction of the current. This case cannot be applied to the case where a connecting method of the first capacitor C1, the second capacitor C2, the first diode D1, and the second diode D2 is different (by a laminate or the like).

In addition, in the above-described first to ninth embodiments, although the case where a storage battery, such as a battery and a fuel battery, is applied as the DC power supply 11 has been described, without limiting thereto, a configuration in which a direct current is obtained by rectifying alternating-current power can be used.

REFERENCE SIGNS LIST

11 . . . DC power supply, 12 . . . step-down chopper circuit, 13 . . . inverter, 14 . . . three-phase motor, 21 . . . current breaker, 22 . . . filter reactor, 23 . . . chopper reactor, C1 . . . first capacitor, C2 . . . second capacitor, Co . . . output capacitor, SC0 . . . capacitor series circuit, SC1 . . . first series circuit, SC2 . . . second series circuit, SW1 . . . first semiconductor switching element, SW2 . . . second semiconductor switching element, D1 . . . first diode, D2 . . . second diode, SWB1 to SWB9 . . . bypass semiconductor switching element, DB1 to DB5 . . . bypass diode

The invention claimed is:

1. A step-down chopper circuit, comprising:
a positive electrode-side power wire connected to a positive electrode of a DC power supply, and a negative electrode-side power wire connected to a negative electrode of the DC power supply;
a capacitor series circuit of a first capacitor and a second capacitor, which is connected between the positive electrode-side power wire and the negative electrode-side power wire;
a first series circuit in which a first switching element and a first diode are connected in series, which is connected in parallel with the first capacitor, and a second series circuit in which a second diode and a second switching element are connected in series, which is connected in parallel with the second capacitor;
a chopper reactor with one end connected to a connection point of the first switching element and the first diode of the first series circuit;
an output capacitor connected between another end of the chopper reactor and a connection point of the second diode and the second switching element of the second series circuit; and
a first bypass current path to be formed with respect to the second capacitor when the first series circuit becomes a short-circuit state, and a second bypass current path to be formed with respect to the first capacitor when the second series circuit becomes a short-circuit state,
the first series circuit including a first bypass element connected in parallel with the first switching element, and a second bypass element connected in parallel with the first diode, and
the second series circuit including a third bypass element connected in parallel with the second diode, and a fourth bypass element connected in parallel with the second switching element.

2. The step-down chopper circuit according to claim 1, wherein
the first diode is set to have a withstand voltage lower than a withstand voltage of the first capacitor, the second diode is set to have a withstand voltage lower than a withstand voltage of the second capacitor, the second switching element is controlled to be in an on state when the first series circuit is short-circuited, and the first switching element is controlled to be in an on state when the second series circuit is short-circuited.

3. The step-down chopper circuit according to claim 1, wherein the first bypass element is a first bypass switching element connected in parallel with the first switching element, and the second bypass element is a first bypass diode connected in parallel with the first diode and having a withstand voltage lower than a withstand voltage of the first capacitor, and the third bypass element is a second bypass diode connected in parallel with the second diode and having a withstand voltage lower than a withstand voltage of the second capacitor, and the fourth bypass element is a second bypass switching element connected in parallel with the second switching element.

4. The step-down chopper circuit according to claim 1, wherein the first bypass element is a first boost diode connected in parallel with the first switching element, and the second bypass element is a first boost switching element connected in parallel with the first diode, and the third bypass element is a second boost switching element connected in parallel with the second diode, and the fourth bypass element is a second boost diode connected in parallel with the second switching element.

5. The step-down chopper circuit according to claim 1, wherein a withstand voltage of the first diode is set to be lower than a withstand voltage of the first capacitor, and a withstand voltage of the second diode is set to be lower than a withstand voltage of the second capacitor.

6. The step-down chopper circuit according to claim 1, wherein the first bypass element is a first bypass switching element connected in parallel with the first switching element, and the second bypass element is a third bypass switching element connected in parallel with the first diode, and the third bypass element is a fourth bypass switching element connected in parallel with the second diode, and the fourth bypass element is a second bypass switching element connected in parallel with the second switching element.

7. A step-down chopper circuit, comprising:

a positive electrode-side power wire connected to a positive electrode of a DC power supply, and a negative electrode-side power wire connected to a negative electrode of the DC power supply;

a capacitor series circuit of a first capacitor and a second capacitor, which is connected between the positive electrode-side power wire and the negative electrode-side power wire;

a first series circuit in which a first switching element and a first diode are connected in series, which is connected in parallel with the first capacitor, and a second series circuit in which a second diode and a second switching element are connected in series, which is connected in parallel with the second capacitor;

a chopper reactor with one end connected to a connection point of the first switching element and the first diode of the first series circuit;

an output capacitor connected between another end of the chopper reactor and a connection point of the second diode and the second switching element of the second series circuit; and a first bypass current path to be formed with respect to the second capacitor when the first series circuit becomes a short-circuit state, and a second bypass current path to be formed with respect to the first capacitor when the second series circuit becomes a short-circuit state, the first series circuit including a first bypass switching element connected in parallel with the first diode, and the second series circuit including a second bypass switching element connected in parallel with the second diode, the second switching element and the second bypass switching element are controlled to be in an on state when the first series circuit is short-circuited, and the first switching element and the first bypass switching element are controlled to be in an on state when the second series circuit is short-circuited.

8. A step-down chopper circuit, comprising:

a positive electrode-side power wire connected to a positive electrode of a DC power supply, and a negative electrode-side power wire connected to a negative electrode of the DC power supply;

a capacitor series circuit of a first capacitor and a second capacitor, which is connected between the positive electrode-side power wire and the negative electrode-side power wire;

a first series circuit in which a first switching element and a first diode are connected in series, which is connected in parallel with the first capacitor, and a second series circuit in which a second diode and a second switching element are connected in series, which is connected in parallel with the second capacitor;

a chopper reactor with one end connected to a connection point of the first switching element and the first diode of the first series circuit;

an output capacitor connected between another end of the chopper reactor and a connection point of the second diode and the second switching element of the second series circuit;

a bypass element connected between a connection point of the first switching element and the first diode and a connection point of the second diode and the second switching element; and a first bypass current path to be formed with respect to the second capacitor when the first series circuit becomes a short-circuit state, and a second bypass current path to be formed with respect to the first capacitor when the second series circuit becomes a short-circuit state.

9. The step-down chopper circuit according to claim 8, wherein the bypass element includes:

a bypass switching element configured to be controlled to be in an on state when a short circuit is detected, or a bypass diode set to have a withstand voltage lower than a withstand voltage of the first capacitor and a withstand voltage of the second capacitor.

10. A step-down chopper circuit, comprising:

a positive electrode-side power wire connected to a positive electrode of a DC power supply, and a negative electrode-side power wire connected to a negative electrode of the DC power supply;

a capacitor series circuit of a first capacitor and a second capacitor, which is connected between the positive electrode-side power wire and the negative electrode-side power wire;

a first series circuit in which a first switching element and a first diode are connected in series, which is connected in parallel with the first capacitor, and a second series circuit in which a second diode and a second switching element are connected in series, which is connected in parallel with the second capacitor;

a chopper reactor with one end connected to a connection point of the first switching element and the first diode of the first series circuit;

an output capacitor connected between another end of the chopper reactor and a connection point of the second diode and the second switching element of the second series circuit;

a first bypass element connected in parallel with the first capacitor, and a second bypass element connected in parallel with the second capacitor; and a first bypass current path to be formed with respect to the second capacitor when the first series circuit becomes a short-circuit state, and a second bypass current path to be formed with respect to the first capacitor when the second series circuit becomes a short-circuit state.

11. The step-down chopper circuit according to claim 10, wherein the first bypass element is a first bypass switching element configured to be controlled to be in an on state when the first series circuit is short-circuited, and the second bypass element is a second bypass switching element configured to be controlled to be in an on state when the second series circuit is short-circuited, or the first bypass element is a first bypass diode set to have a withstand voltage lower than a withstand voltage of the first capacitor, and the second bypass element is a second bypass diode set to have a withstand voltage lower than a withstand voltage of the second capacitor.

* * * * *